(12) United States Patent
Hasegawa et al.

(10) Patent No.: US 12,257,705 B2
(45) Date of Patent: Mar. 25, 2025

(54) ROBOT, ROBOT CONTROL METHOD, AND NON-TRANSITORY COMPUTER-READABLE RECORDING MEDIUM

(71) Applicant: CASIO COMPUTER CO., LTD., Tokyo (JP)

(72) Inventors: Hirokazu Hasegawa, Koganei (JP); Miyuki Urano, Akiruno (JP); Yoshihiro Kawamura, Fussa (JP); Chihiro Toyama, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 233 days.

(21) Appl. No.: 17/942,373

(22) Filed: Sep. 12, 2022

(65) Prior Publication Data

US 2023/0100762 A1    Mar. 30, 2023

(30) Foreign Application Priority Data

Sep. 29, 2021  (JP) ................................. 2021-158663

(51) Int. Cl.
  B25J 9/00  (2006.01)
  B25J 13/00  (2006.01)
  B25J 13/08  (2006.01)

(52) U.S. Cl.
  CPC ........... B25J 9/0003 (2013.01); B25J 13/003 (2013.01); B25J 13/081 (2013.01); B25J 13/088 (2013.01)

(58) Field of Classification Search
  CPC ...... B25J 9/0003; B25J 13/003; B25J 13/081; B25J 13/088; B25J 11/0005
  See application file for complete search history.

(56) References Cited

U.S. PATENT DOCUMENTS

| | | | |
|---|---|---|---|
| 10,576,618 B2 | 3/2020 | Otsuka | |
| 10,614,203 B2 | 4/2020 | Onodera | |
| 11,192,257 B2 | 12/2021 | Hayashi | |
| 11,485,021 B2 | 11/2022 | Watanuki | |
| 11,780,098 B2 | 10/2023 | Watanuki | |
| 2002/0161480 A1* | 10/2002 | Kakutani | G06N 3/008 700/250 |
| 2014/0277729 A1 | 9/2014 | Nakamura et al. | |

(Continued)

FOREIGN PATENT DOCUMENTS

| | | |
|---|---|---|
| JP | 2001157985 A | 6/2001 |
| JP | 2002120179 A | 4/2002 |

(Continued)

OTHER PUBLICATIONS

Japanese Office Action (and an English language translation thereof) dated Apr. 2, 2024, issued in counterpart Japanese Application No. 2021-158663.

(Continued)

*Primary Examiner* — Bhavesh V Amin
*Assistant Examiner* — Dylan M Katz
(74) *Attorney, Agent, or Firm* — Holtz, Holtz & Volek PC

(57) ABSTRACT

The robot includes a storage unit and a control unit. The control unit acquires outside stimulus feature amounts that are feature amounts of an outside stimulus acting from outside, stores the acquired outside stimulus feature amounts in the storage unit as a history, compares outside stimulus feature amounts acquired at a certain timing with outside stimulus feature amounts stored in the storage unit to calculate a first similarity degree, and controls operations based on the calculated first similarity degree.

10 Claims, 18 Drawing Sheets

(56) References Cited

U.S. PATENT DOCUMENTS

| | | | |
|---|---|---|---|
| 2017/0282373 A1* | 10/2017 | Kondo | G10L 15/22 |
| 2019/0184567 A1* | 6/2019 | Hayashi | G10L 25/51 |
| 2020/0110968 A1* | 4/2020 | Onodera | G06V 10/82 |
| 2021/0023704 A1* | 1/2021 | Totsuka | B25J 9/1664 |
| 2021/0089172 A1 | 3/2021 | Joo | |
| 2021/0254979 A1* | 8/2021 | Faragher | G01C 21/1652 |
| 2021/0362343 A1 | 11/2021 | Kim | |
| 2024/0042619 A1 | 2/2024 | Shimada | |

FOREIGN PATENT DOCUMENTS

| | | | |
|---|---|---|---|
| JP | 2008048342 A | 2/2008 | |
| JP | 2017108767 A | 6/2017 | |
| JP | 2017226044 A | 12/2017 | |
| JP | 6494062 B2 | 4/2019 | |
| JP | 2019217605 A | 12/2019 | |
| WO | 2017175559 A1 | 10/2017 | |
| WO | 2020230928 A1 | 11/2020 | |
| WO | 2021053949 A1 | 3/2021 | |

OTHER PUBLICATIONS

Extended European Search Report (EESR) dated Feb. 13, 2023, issued in counterpart European Application No. 22195283.1.

Japanese Office Action (and an English language translation thereof) dated Jul. 9, 2024, issued in counterpart Japanese Application No. 2021-158663.

* cited by examiner

FIG. 6

| RECOGNITION LEVEL | DETERMINATION CONDITIONS | NORMAL ACTION | | FRIENDLY ACTION (RECOGNIZING OWNER) | |
|---|---|---|---|---|---|
| | | OCCURRENCE FREQUENCY (%) | OPERATION CONTENTS | OCCURRENCE FREQUENCY (%) | OPERATION CONTENTS |
| NOT OWNER | OTHER THAN BELOW | 100 | DETERMINED BASED ON LEARNING VALUE AND PERSONALITY | 0 | — |
| POSSIBLY OWNER | MEDIAN SIMILARITY DEGREE WITH RESPECT TO VOICE HISTORY | 100 − (LEARNING VALUE/10)×50 | DETERMINED BASED ON LEARNING VALUE AND PERSONALITY | (LEARNING VALUE/10)×50 | ACTION OF "WHAT?" |
| PERHAPS OWNER | HIGH SIMILARITY DEGREE WITH RESPECT TO VOICE HISTORY | 100 − (LEARNING VALUE/10)×50 | DETERMINED BASED ON LEARNING VALUE AND PERSONALITY | (LEARNING VALUE/10)×50 | PLEASING ACTION BECAUSE OWNER IS THERE |
| DEFINITELY OWNER | HIGH SIMILARITY DEGREE WITH RESPECT TO REGISTERED VOICE | 100 − (LEARNING VALUE/10)×50 | DETERMINED BASED ON LEARNING VALUE AND PERSONALITY | (LEARNING VALUE/10)×50 | ACTION OF APPROACHING OWNER PLEASANTLY BECAUSE OWNER IS THERE |

FIG. 7

| RECOGNITION LEVELS | DETERMINATION CONDITIONS | NORMAL ACTION | | FRIENDLY ACTION (RECOGNIZING OWNER) | |
|---|---|---|---|---|---|
| | | OCCURRENCE FREQUENCY (%) | OPERATION CONTENTS | OCCURRENCE FREQUENCY (%) | OPERATION CONTENTS |
| NOT CARETAKER | OTHER THAN BELOW | 100 | DETERMINED BASED ON LEARNING VALUE AND PERSONALITY | 0 | — |
| POSSIBLE CARETAKER | MEDIAN SIMILARITY DEGREE WITH RESPECT TO TOUCH HISTORY | 100 − (LEARNING VALUE/10)×50 | DETERMINED BASED ON LEARNING VALUE AND PERSONALITY | (LEARNING VALUE/10)×50 | ACTION OF "WHAT?" |
| PERHAPS CARETAKER | HIGH SIMILARITY DEGREE WITH RESPECT TO TOUCH HISTORY | 100 − (LEARNING VALUE/10)×50 | DETERMINED BASED ON LEARNING VALUE AND PERSONALITY | (LEARNING VALUE/10)×50 | PLEASING ACTION BECAUSE CARETAKER IS PERHAPS THERE |
| DEFINITELY CARETAKER | VERY HIGH SIMILARITY DEGREE WITH RESPECT TO TOUCH HISTORY | 100 − (LEARNING VALUE/10)×50 | DETERMINED BASED ON LEARNING VALUE AND PERSONALITY | (LEARNING VALUE/10)×50 | VERY PLEASING ACTION BECAUSE CARETAKER IS DEFINITELY THERE |

FIG. 10

| MOTION TRIGGERS | MOTION TYPES | LEARNING VALUES | | | | | | | | | | |
|---|---|---|---|---|---|---|---|---|---|---|---|---|
| | | 0 | 1 | 2 | 3 | 4 | 5 | 6 | 7 | 8 | 9 | 10 |
| BODY IS STROKED | BASIC MOTION 0-0 | 100 | 100 | 80 | 80 | 30 | 30 | 20 | 20 | 20 | 20 | 10 |
| | BASIC MOTION 0-1 | 0 | 0 | 20 | 20 | 50 | 50 | 20 | 20 | 20 | 20 | 10 |
| | BASIC MOTION 0-2 | 0 | 0 | 0 | 0 | 20 | 20 | 40 | 40 | 20 | 20 | 20 |
| | BASIC MOTION 0-3 | 0 | 0 | 0 | 0 | 0 | 0 | 20 | 20 | 20 | 20 | 20 |
| | PERSONALITY MOTION 0-0 | 0 | 0 | 0 | 0 | 0 | 0 | 0 | 0 | 20 | 20 | 40 |
| ROBOT IS TALKED TO | BASIC MOTION 1-0 | 100 | 90 | 80 | 80 | 60 | 60 | 30 | 30 | 30 | 30 | 30 |
| | BASIC MOTION 1-1 | 0 | 10 | 20 | 20 | 40 | 40 | 50 | 50 | 40 | 40 | 30 |
| | PERSONALITY MOTION 1-0 | 0 | 0 | 0 | 0 | 0 | 0 | 20 | 20 | 30 | 30 | 40 |
| LARGE SOUND IS MADE | BASIC MOTION 2-0 | 100 | 90 | 80 | 80 | 60 | 60 | 30 | 30 | 20 | 20 | 20 |
| | BASIC MOTION 2-1 | 0 | 10 | 20 | 20 | 40 | 40 | 50 | 50 | 20 | 20 | 20 |
| | BASIC MOTION 2-2 | 0 | 0 | 0 | 0 | 0 | 0 | 20 | 20 | 40 | 40 | 20 |
| | PERSONALITY MOTION 2-0 | 0 | 0 | 0 | 0 | 0 | 0 | 0 | 0 | 20 | 20 | 40 |
| PROCESS OF BREATHING CYCLE | BASIC MOTION 3-0 | 100 | 90 | 80 | 80 | 60 | 60 | 30 | 30 | 20 | 20 | 20 |
| | BASIC MOTION 3-1 | 0 | 10 | 20 | 20 | 40 | 40 | 50 | 50 | 20 | 20 | 20 |
| | BASIC MOTION 3-2 | 0 | 0 | 0 | 0 | 0 | 0 | 20 | 20 | 40 | 40 | 20 |
| | PERSONALITY MOTION 3-0 | 0 | 0 | 0 | 0 | 0 | 0 | 0 | 0 | 20 | 20 | 40 |
| ⋮ | ⋮ | ⋮ | ⋮ | ⋮ | ⋮ | ⋮ | ⋮ | ⋮ | ⋮ | ⋮ | ⋮ | ⋮ |

FIG. 11

| MOTION TYPES | PERSONALITY TYPES | OPERATION CONTENTS |
|---|---|---|
| BASIC MOTION 0-0 | | RING "KYYAN" |
| BASIC MOTION 0-1 | | RING "WOON" |
| BASIC MOTION 0-2 | | RING "NYYAN" |
| BASIC MOTION 0-3 | | RING "HYUUIOO" |
| PERSONALITY MOTION 0-0 | HAPPY | RING "KYYAN" HAPPILY |
| | ACTIVE | SING "LATTATTA" ENERGETICALLY |
| | SHY | RING "HYUU" SHILY |
| | WANTED | RING "WOON" IN WANTED WAY |
| BASIC MOTION 1-0 | | RING "NN"? |
| BASIC MOTION 1-1 | | RING "WON"? |
| PERSONALITY MOTION 1-0 | HAPPY | RING "UUN" HAPPILY |
| | ACTIVE | RING "UUN" ENERGETICALLY |
| | SHY | RING "UUN" SHILY |
| | WANTED | RING "UUN" IN WANTED WAY |
| BASIC MOTION 2-0 | | RING "PII" SHORTLY |
| BASIC MOTION 2-1 | | RING "GYAA" |
| BASIC MOTION 2-2 | | RING "HOWAU" IN LAGGED WAY |
| PERSONALITY MOTION 2-0 | HAPPY | RING "KYAA" HAPPILY |
| | ACTIVE | RING "KYAA" ENERGETICALLY |
| | SHY | RING "KYAA" SHILY |
| | WANTED | RING "KYAA" IN WANTED WAY |
| BASIC MOTION 3-0 | | NORMAL BREATHING ACTION |
| BASIC MOTION 3-1 | | BREATHING ACTION WITH HEAD WAVING |
| BASIC MOTION 3-2 | | BREATHING ACTION WITH YAWNING |
| PERSONALITY MOTION 3-0 | HAPPY | BREATHING ACTION IN HAPPY WAY |
| | ACTIVE | BREATHING ACTION IN ENERGETIC WAY |
| | SHY | BREATHING ACTION IN SHY WAY |
| | WANTED | BREATHING ACTION IN WANTED WAY |
| ⋮ | ⋮ | ⋮ |

ROBOT, ROBOT CONTROL METHOD, AND NON-TRANSITORY COMPUTER-READABLE RECORDING MEDIUM

BACKGROUND

1. Technical Field

The present disclosure relates to a robot, a robot control method, and a non-transitory computer-readable recording medium.

2. Related Art

Conventionally, various robots have been developed, but in recent years, not only industrial robots but also consumer robots such as pet robots have been developed. For example, JP 2001-157985 A discloses a robot device capable of easily and accurately identifying a user and making the user feel attached.

SUMMARY

One aspect of the robot according to the present disclosure includes
a storage unit; and at least one processor, wherein,
the processor is configured to:
acquire outside stimulus feature amounts that are feature amounts of an outside stimulus acting from outside,
store the acquired outside stimulus feature amounts in the storage unit as a history,
calculate a first similarity degree by comparing outside stimulus feature amounts acquired at a certain timing with the outside stimulus feature amounts stored in the storage unit, and
control operations based on the calculated first similarity degree.

BRIEF DESCRIPTION OF THE DRAWINGS

FIG. 6 is a chart for explaining an example of a friendly action by a voice according to the embodiment;

FIG. 7 is a chart illustrating an example of a friendly action by a stroking method according to the embodiment;

FIG. 10 is a drawing illustrating an example of a learning table according to the embodiment;

FIG. 11 is a drawing illustrating an example of an operation content table according to the embodiment;

Hereinafter, the embodiments of the present disclosure will be described with reference to the drawings. Additionally, in the drawings, the same or corresponding parts are denoted by the same reference numerals.

DETAILED DESCRIPTION

Figure 1:
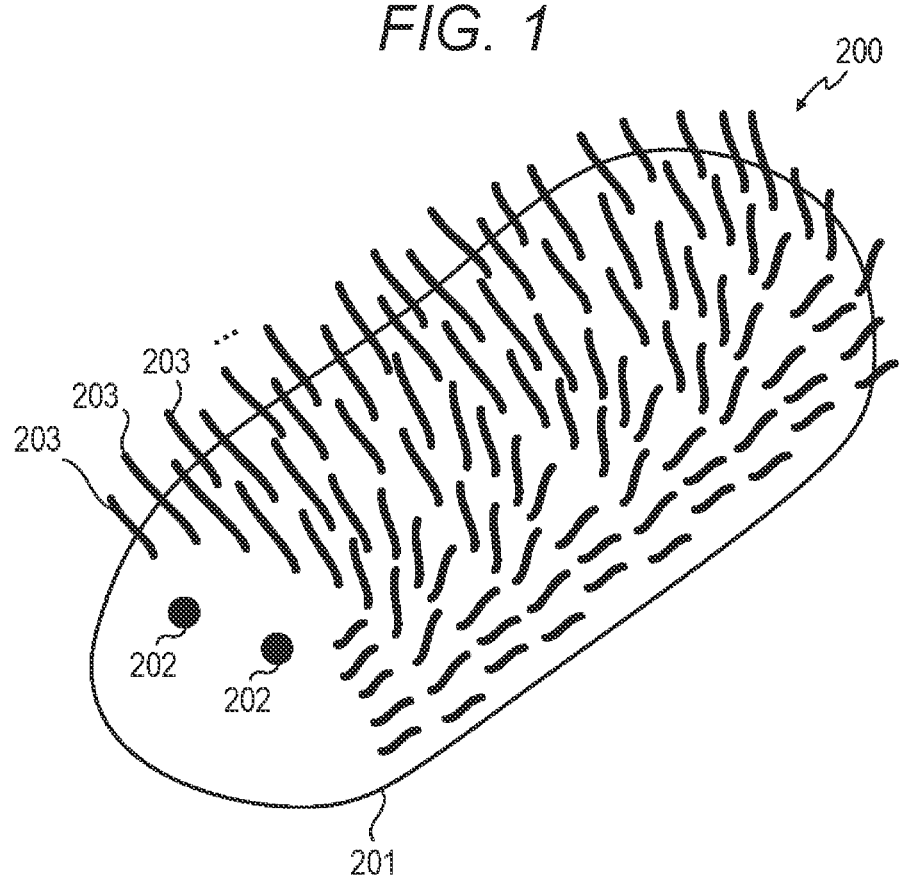
FIG. 1 is a drawing illustrating an appearance of a robot according to the embodiment.
Figure 2:
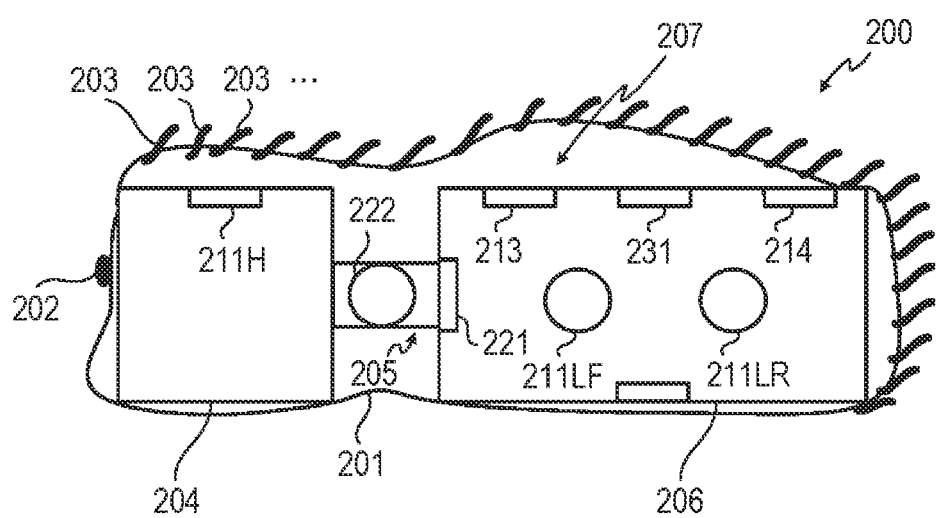
FIG. 2 is a cross-sectional view of the robot according to the embodiment as viewed from a side surface.

As illustrated in FIG. 1, a robot 200 according to the embodiment imitates a small animal and is covered with an exterior 201 including a decorative part 202 imitating eyes and a bushy fur 203. The exterior 201 covers a housing 207 of the robot 200. As illustrated in FIG. 2, the housing 207 of the robot 200 includes a head portion 204, a connecting portion 205, and a body portion 206, and the head portion 204 and the body portion 206 are connected by the connecting portion 205.

Furthermore, in the following description, in a case where the robot 200 is placed so as to lie on a placement surface such as a floor, a direction of a portion corresponding to a face of the robot 200 (a portion of the head portion 204 on a side opposite to the body portion 206) is defined as "front", a direction of a portion corresponding to a buttock (a portion of the body portion 206 on a side opposite to the head portion 204) is defined as "back", a direction of a portion in contact with the placement surface is defined as "down (bottom)", and the opposite direction is defined as "up (top)". Moreover, a direction orthogonal to a straight line extending in a front-back direction of the robot 200 and also orthogonal to a straight line extending in an up-down direction (top-bottom direction) is defined as a width direction. Then, a surface on right side when the head portion 204 is viewed from the body portion 206 is defined as a right side surface, and a surface on left side is defined as a left side surface.

As illustrated in FIG. 2, the body portion 206 is in contact with the placement surface such as a floor or a table on which the robot 200 is placed via the exterior 201. As illustrated in FIG. 2, a motor 221 is provided at a front end portion of the body portion 206, and the head portion 204 is connected to the front end portion of the body portion 206 via a connecting portion 205. Furthermore, the connecting portion 205 is provided with a motor 222. In addition, although the motor 221 is provided in the body portion 206 in FIG. 2, it may be provided in the connecting portion 205 or may be provided in the head portion 204.

The connecting portion 205 couples the body portion 206 and the head portion 204 in such a way that the robot is rotatable (by the motor 221) about a first rotation axis passing through the connecting portion 205 and extending in the front-back direction of the body portion 206. The motor 221 rotates (normally rotates) the head portion 204 with respect to the body portion 206 clockwise (right-handed rotation) around the first rotation axis within a forward rotation angle range, or rotates (reversely rotates) the head portion 204 with respect to the body portion 206 counterclockwise (left-handed rotation) around the first rotation axis within a reverse rotation angle range. Furthermore, the clockwise rotation in this description is the clockwise rotation when the direction of the head portion 204 is viewed from the body portion 206. The maximum value of an angle of twisting and rotating the head portion 204 rightward (clockwise) or leftward (counterclockwise) is arbitrary, but an angle of the head portion in a state where the head portion 204 is not twisted rightward or leftward is referred to as a twist reference angle.

Furthermore, the connecting portion 205 couples the body portion 206 and the head portion 204 in such a way that the robot is rotatable about a second rotation axis (by the motor 222) passing through the connecting portion 205 and extending in the width direction of the body portion 206. The motor 222 rotates (normally rotates) the head portion 204 upward about the second rotation axis within the forward rotation angle range or rotates (reversely rotates) downward within the reverse rotation angle range. The maximum value of an angle of rotation upward or downward is arbitrary, but an angle of the head portion 204 in a state where the head portion 204 is not rotated upward or downward is referred to as a vertical reference angle. When the head portion 204 is rotated at the vertical reference angle or downward from the vertical reference angle by a vertical rotation about the second rotation axis, the head portion can contact the placement surface such as a floor or a table on which the robot 200 is placed via the exterior 201. In addition, although FIG. 2 illustrates an example in which the first rotation axis and the second rotation axis are orthogonal to each other, the first and second rotation axes may not be orthogonal to each other.

Figure 3:
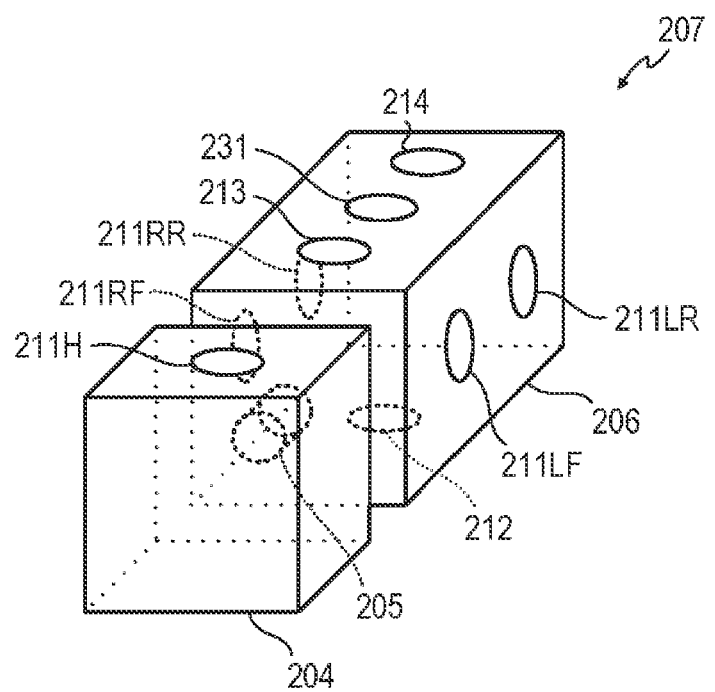
FIG. 3 is a diagram illustrating a housing of the robot according to the embodiment.

Furthermore, the robot 200 includes a stroke sensor 211, and can detect that the user strokes or pats the robot 200. More specifically, as illustrated in FIG. 2, a stroke sensor 211H is provided on the head portion 204, and it is possible to detect that the user strokes or pats the head portion 204. In addition, as illustrated in FIGS. 2 and 3, a stroke sensor 211LF and a stroke sensor 211LR are provided in front of and behind the left side surface of the body portion 206, and a stroke sensor 211RF and a stroke sensor 211RR are provided in front of and behind the right side surface of the body portion 206, in such a way that it is possible to detect that the user strokes or pats the body portion 206.

Furthermore, the robot 200 includes an acceleration sensor 212 in the body portion 206, and can detect a posture (orientation) of the robot 200 and detect that the robot is lifted, changed in orientation, or thrown by the user. Moreover, the robot 200 includes a gyro sensor 213 in the body portion 206, and can detect that the robot 200 is vibrating or rotating.

Furthermore, the robot 200 includes a microphone 214 in the body portion 206, and can detect an environment (outside) sound. And the robot 200 includes a speaker 231 in the body portion 206, and can utter a cry or sing a song using the speaker 231.

Furthermore, in the present embodiment, the acceleration sensor 212, the gyro sensor 213, the microphone 214, and the speaker 231 are provided in the body portion 206, but all or a part thereof may be provided in the head portion 204. In addition to the acceleration sensor 212, the gyro sensor 213, the microphone 214, and the speaker 231 provided in the body portion 206, all or a part thereof may also be provided in the head portion 204. Moreover, the stroke sensors 211 each is provided in the head portion 204 and the body portion 206, but may be provided only in one of the head portion 204 and the body portion 206. Then, a plurality of these components may be provided.

Figure 4:
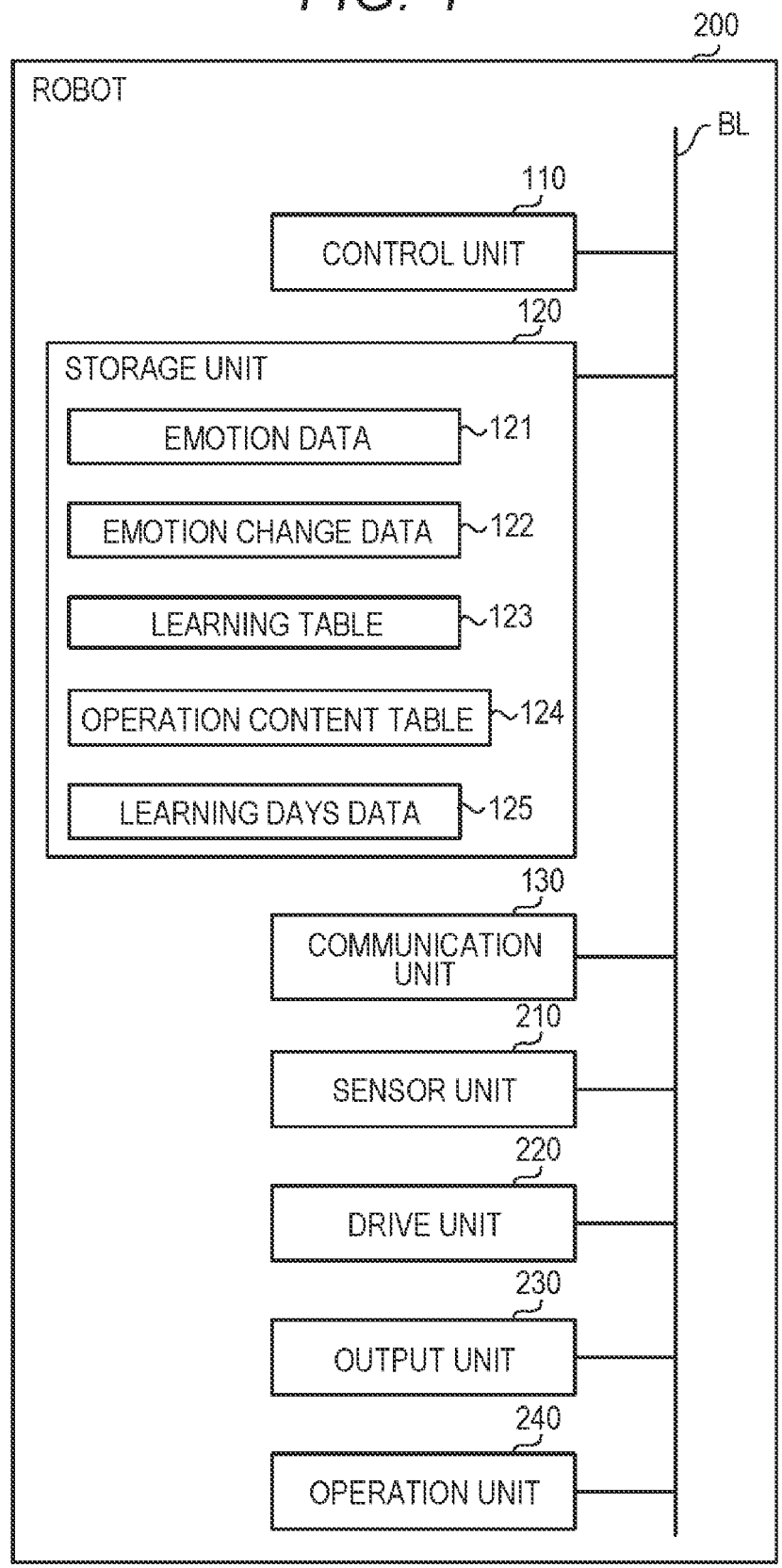
FIG. 4 is a block chart illustrating a functional configuration of the robot according to the embodiment.

Next, a functional configuration of the robot 200 will be described. As illustrated in FIG. 4, the robot 200 includes a control unit 110, a storage unit 120, a communication unit 130, a sensor unit 210, a drive unit 220, an output unit 230, and an operation unit 240.

The control unit 110 includes, for example, a central processing unit (CPU) as a processor or the like, and executes various processing to be described later by a program stored in the storage unit 120. Note that since the control unit 110 corresponds to a multi-thread function of executing a plurality of processing in parallel, it is possible to execute various processes to be described later in parallel. Furthermore, the control unit 110 also has a clock function and a timer function, and can measure date and time and the like.

The storage unit 120 includes a read only memory (ROM), a flash memory, a random access memory (RAM), and the like. The ROM stores a program executed by the CPU of the control unit 110 and data necessary for executing the program in advance. The flash memory is a writable nonvolatile memory, and stores data desired to be stored even after the power is turned off. The RAM stores data created or changed during a program execution. The storage unit 120 stores, for example, a sound buffer, a voice history, the stroke history, emotion data 121, emotion change data 122, a learning table 123, and the like, to be described later.

The communication unit 130 includes a communication module compatible with a wireless local area network (LAN), Bluetooth (registered trademark), or the like, and performs data communication with an external device such as a smartphone.

The sensor unit 210 includes the stroke sensor 211, the acceleration sensor 212, the gyro sensor 213, and the microphone 214 described above. The control unit 110 acquires detection values detected by various sensors included in the sensor unit 210 as outside stimulus data representing an outside stimulus acting on the robot 200. Note that the sensor unit 210 may include a sensor other than the stroke sensor 211, the acceleration sensor 212, the gyro sensor 213, and the microphone 214. By increasing the types of sensors included in the sensor unit 210, the types of outside stimuli that can be acquired by the control unit 110 can be increased. For example, the sensor unit 210 may include an image acquisition unit such as a charge-coupled device (CCD) image sensor. In this case, the control unit 110 recognizes images acquired by the image acquisition unit, and can determine who the surrounding people are (for example, the owner, the caretaker, the person who is not known, or the like) etc.

The stroke sensor 211 detects contact of a certain object. The stroke sensor 211 is configured by, for example, a pressure sensor or a capacitance sensor. The control unit 110 acquires a contact intensity and contact time based on the detection values from the stroke sensor 211, and can detect the outside stimuli such as the robot 200 being stroked or pat by the user based on these values (for example, see JP 2019-217122 A). Note that the control unit 110 may detect these outside stimuli with a sensor other than the stroke sensor 211 (for example, see JP 6575637 B2).

The acceleration sensor 212 detects acceleration in three axial directions including the front-back direction, the width (left-right) direction, and the up-down direction of the body portion 206 of the robot 200. Since the acceleration sensor 212 detects gravitational acceleration when the robot 200 is stationary, the control unit 110 can detect the current posture of the robot 200 based on the gravitational acceleration detected by the acceleration sensor 212. Furthermore, for example, in a case where the user lifts or throws the robot 200, the acceleration sensor 212 detects the acceleration accompanying movements of the robot 200 in addition to the gravitational acceleration. Therefore, the control unit 110 can detect the movements of the robot 200 by removing the component of the gravitational acceleration from the detection values detected by the acceleration sensor 212.

The gyro sensor 213 detects angular velocities of three axes of the robot 200. From the maximum values of the angular velocities of the three axes, the control unit 110 can determine vibration state of the robot 200.

Figure 5:
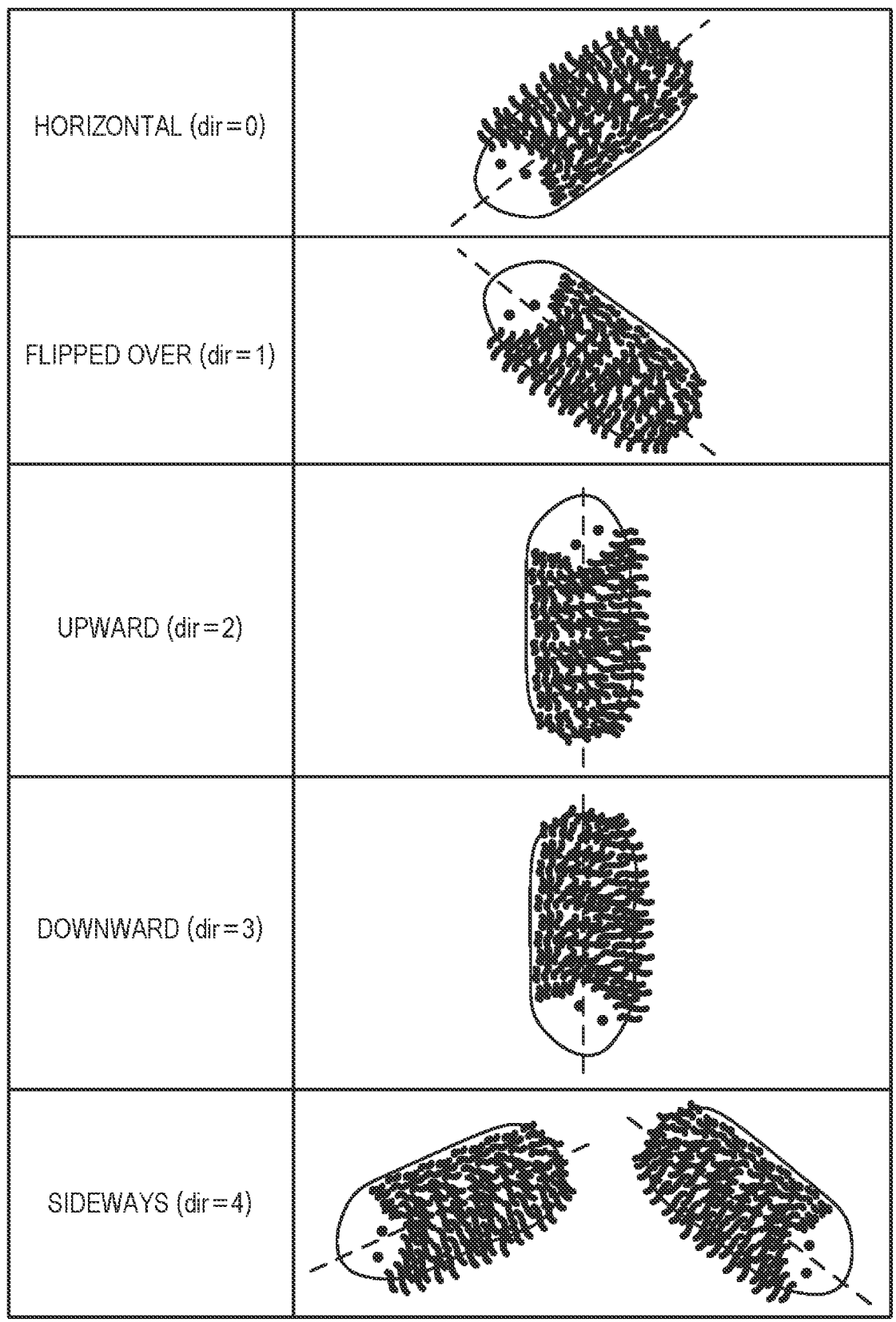
FIG. 5 is a diagram for explaining types of postures of the robot according to the embodiment.

In the present embodiment, in the stroke input processing to be described later, the control unit 110 determines whether the current posture of the robot 200 is horizontal, flipped over, upward, downward, or sideways as illustrated in FIG. 5 based on the gravitational acceleration detected by the acceleration sensor 212. Then, according to determination results, as illustrated in FIG. 5, any value of numerical values 0 to 4 is stored in the storage unit 120 as a value of variable dir.

However, when the control unit 110 determines the posture of the robot 200, not only the current detection values of the acceleration sensor 212 but also a detection value history of the acceleration sensor 212 may be used. Furthermore, the control unit 110 may determine the posture of the robot 200 using a discriminator (a neural network or the like) obtained by preparing and applying machine learning on a large number of data of the detection value history of the acceleration sensor 212 to which information of the posture of the robot 200 is added as a correct answer label. Moreover, the control unit 110 may determine the posture of the robot 200 using both the determination results by the machine-learned identifier and the current detection values of the acceleration sensor 212 (the acceleration results acquired at the timing of determining the posture).

Furthermore, in the stroke input processing to be described later, the control unit 110 acquires stroke intensity of the head portion based on the detection values of the stroke sensor 211H, the stroke intensity of the left side surface based on the detection values of the stroke sensor 211LF and the stroke sensor 211LR, the stroke intensity of the right side surface based on the detection values of the stroke sensor 211RF and the stroke sensor 211RR, and vibration intensity based on the detection values of the gyro sensor 213. Then, the control unit 110 stores the acquired intensities as values of a variable touch_Head (a stroke intensity of the head portion), a variable touch_Left (a stroke intensity of the left side surface), a variable touch_Right (a stroke intensity of the right side surface), and a variable gyro_Level (a vibration intensity) in the storage unit 120.

In the stroke input processing, the control unit 110 integrates various detected values acquired as described above and handles the integrated values as stroke feature parameters. In other words, the stroke feature parameters include five-dimensional information of the posture (dir "direction") of the robot 200, the stroke intensity of the head portion (touch_Head), the stroke intensity of the left side surface (touch_Left), the stroke intensity of the right side surface (touch_Right), and the vibration intensity (gyro_Level). However, the posture (dir) of the robot 200 when a person holds the robot 200 varies greatly among individuals. On the other hand, the vibration intensity (gyro_Level) fluctuates greatly even when the robot is held by the same person.

Therefore, in the present embodiment, in a case of determining the similarity degree of the stroke feature parameters, when the postures (dir) do not match, it is determined that the stroke feature parameters are dissimilar, and an influence degree of the vibration intensity is made smaller than the stroke intensity. For example, in a case where each stroke intensity takes a value equal to or more than 0 and equal to or less than M, the value of the vibration intensity is adjusted in such a way that a value equal to or more than 0 and equal to or less than M±A is taken (where A is a real number greater than 1, for example, 6).

Furthermore, a history storage number (which is 256 in the present embodiment) of the stroke feature parameters is stored in the storage unit 120 by a first-in first-out (FIFO) method. In the present embodiment, a FIFO that stores stroke feature parameters is referred to as a TFIFO, and the number of stroke feature parameters stored in the TFIFO is stored in a variable called TFIFO_SIZE. In other words, an initial value of TFIFO_SIZE is 0, and is incremented by 1 each time when a new stroke feature parameter is stored. Then, after the number of stroke feature parameters is increased to the history storage number, TFIFO_SIZE remains constant as the history storage number, and the oldest stroke feature parameter is deleted from TFIFO every time when a new stroke feature parameter is stored in TFIFO. TFIFO is also referred to as a stroke history because a stroke feature parameter history is stored.

Returning to FIG. 4, the microphone 214 detects sounds around the robot 200. The control unit 110 can detect, for example, that the user is calling the robot 200, the user is clapping hands, or the like, based on sound components detected by the microphone 214.

Specifically, the control unit 110 samples sound data acquired from the microphone 214 at a prescribed sampling frequency (16,384 Hz in the present embodiment) and a quantization bit rate (16 bits in the present embodiment), and stores sound data in the sound buffer of the storage unit 120. In the present embodiment, it is assumed that one sound buffer includes the sampling data of 512 samples, and audio similarity degree is determined by using 16 consecutive sound buffers as one unit. In the present embodiment, the 16 consecutive sound buffers are represented by array variables of the sound buffer [0] to sound buffer [15]. The 16 sound buffers store voice data of 512 samples×16/16384 Hz=0.5 seconds.

Furthermore, the processing of storing the sound data acquired from the microphone 214 by the control unit 110 in the sound buffers is executed in parallel with other processing as a sound buffer storage thread. Moreover, in the voice feature parameter calculation processing to be described later in the present embodiment, the control unit 110 performs processing of calculating three pieces of cepstrum information from 512 samples of sampling data in one sound buffer for the 16 sound buffers. The control unit 110 handles 48 (=3×16) pieces of data obtained by this manner as 48 dimensional voice feature parameters.

The history storage number (for example, 256) of the voice feature parameters is also stored in the storage unit 120 by the first-in first-out (FIFO) method. In the present embodiment, the FIFO that stores the voice feature parameters is referred to as VFIFO, and the number of voice feature parameters stored in VFIFO is stored in a variable of VFIFO_SIZE. The VFIFO is also referred to as the voice history because the voice feature parameter history is stored.

Returning to FIG. 4, the drive unit 220 includes the motor 221 and the motor 222 as movable units for expressing the movements of the robot 200 (own device), and is driven by the control unit 110. Via controlling the drive unit 220 by the control unit 110, the robot 200 can express an operation of, for example, lifting the head portion 204 (rotating upward about the second rotation axis) or twisting laterally (twisting rightward or leftward about the first rotation axis). Furthermore, the robot 200 can also move by, for example, laterally rotating the head portion 204 with the head portion facing downward. Operation control data for performing these operations is recorded in the storage unit 120, and the operations of the robot 200 are controlled based on the detected outside stimuli, a learning value to be described later, and the like.

Note that the above is an example of the drive unit 220, and the drive unit 220 may include wheels, crawlers, limbs, and the like, in such a way that the robot 200 can move or can move the body in an arbitrary direction.

The output unit 230 includes the speaker 231, and when the control unit 110 inputs sound data to the output unit 230, the sound is output from the speaker 231. For example, when the control unit 110 inputs data of a cry of the robot 200 to the output unit 230, the robot 200 emits a pseudo cry. This cry data is also recorded in the storage unit 120, and the cry is selected based on the detected outside stimuli, the learning value to be described later, and the like. Note that the output unit 230 including the speaker 231 is also referred to as a sound output unit.

Furthermore, instead of the speaker 231 or in addition to the speaker 231, a display such as a liquid crystal display or a light emitting unit such as a light emitting diode (LED) may be provided as the output unit 230, and an image based on the detected outside stimuli, the learning value to be described later, or the like, may be displayed on the display, or the LED or the like may be caused to emit light.

The operation unit 240 includes, for example, an operation button, a volume-control knob, and the like. The operation unit 240 is an interface for receiving an operation by a user (owner or lender), for example, power ON/OFF, volume adjustment of an output sound, and the like. Note that the robot 200 may include only a power switch as the operation unit 240 inside the exterior 201 and may not include other operation buttons, volume-control knobs, and the like in order to further enhance the simulation of living things. Even in this case, an operation such as volume adjustment of the robot 200 can be performed using an outside smartphone or the like connected via the communication unit 130.

The functional configuration of the robot 200 has been described above. Next, an owner registration function, a calling reaction function, and a friendly action function, which are characteristic functions of the robot 200, will be described.

The owner registration function is a function that, when the robot 200 is repeatedly called for a certain registration time (for example, 3 minutes) from the first power-on, stores the voice feature parameters in the storage unit 120 as an owner's feature (a registered voice), and notifies the user of the stored voice feature parameters by an operation (for example, a pleasing action of ringing five times). In the present embodiment, only the voice feature parameters are stored in the storage unit 120 as the registered voice of the owner's feature, but the stroke feature parameters may also be stored in the storage unit 120 as the owner's feature (registered stroking method information) based on the stroke feature parameters repeatedly acquired during the registration time.

The calling reaction function is a function of recognizing who a calling person is regardless of whether the calling person is the owner, and performing an operation (for example, an action of making a gesture of "What?") of reacting to the calling when the robot 200 is repeatedly called (after the owner registration or after a lapse of a certain registration time (for example, 3 minutes) or more since the first power-on).

The friendly action function is a function of recognizing the owner or the caretaker of the robot and performing a motion (a friendly action) different from a motion (a normal action) for other people in a case where the voice feature parameters or the stroke feature parameters acquired most recently based on the voice history or the stroke history is similar to a past calling or stroking. However, when the owner or the caretaker always performs the friendly action, there is a possibility that the operation content becomes a pattern, and thus, in the present embodiment, the friendly action is performed with a probability corresponding to a learning degree (the learning value to be described later) of the robot 200.

Specifically, for the friendly action according to the voice, as shown in FIG. 6, when the similarity degree between the voice feature parameters of the acquired voice and the registered voice is high, the person who has called is recognized as "definitely the owner", the friendly action (for example, an action of approaching the owner pleasantly) at the time of recognizing the person as definitely the owner is performed with a probability of (learning value/10)×50%, and the normal action determined based on the learning value and the like is performed with a probability of 100−(learning value/10)×50%.

In addition, in a case where the voice feature parameters of the acquired voice are highly (or medianly) similar to the voice history in a case where the voice feature parameters are not recognized as "definitely the owner", the friendly action (for example, a pleasing action (or "What?" action)) at the time of recognizing the person who has called as "perhaps the owner (or may be the owner)" is performed with the probability of (learning value/10)×50%, and the normal action determined based on the learning value or the like is performed with the probability of 100−(learning value/10)×50%.

Then, when the similarity degree between the voice feature parameters of the acquired voice and the voice history is low, the person who has called is recognized as not the owner, and the normal action determined based on the learning value or the like is performed with a probability of 100% without performing the friendly action at all.

In addition, as for the friendly action according to the stroking method, as illustrated in FIG. 7, when the similarity degree between the acquired stroke feature parameters and the stroke history is very high, the friendly action (for example, a very pleasing action) at the time when the person who has stroked is recognized as "the caretaker" is performed with a probability of (learning value/10)×50%, and the normal action determined based on the learning value or the like is performed with a probability of 100−(learning value/10)×50%.

Furthermore, in a case where the similarity degree between the acquired stroke feature parameters and the stroke history is high (or median), the friendly action (for example, a pleasing action (or "What?" action)) at the time of recognizing the person who has stroked as "perhaps the caretaker (or may be the caretaker)" is performed with a probability of (learning value/10)×50%, and the normal action determined based on the learning value or the like is performed with a probability of 100−(learning value/10)× 50%.

Then, when the similarity degree between the acquired stroke feature parameters and the stroke history is low, it is recognized that the person who has stroked is not the caretaker, and the normal action determined based on the learning value or the like is performed with a probability of 100% without performing any friendly action at all.

Note that, in the present embodiment, the friendly action is defined separately according to voice (FIG. 6) and according to stroking (FIG. 7), but the definition of the friendly action is not limited thereto. For example, both the similarity degree in the voice history and the similarity degree in the stroke history may be used to respectively define a friendly action in a case where both have high similarity degree, a friendly action in a case where only the similarity degree in the voice history is high, and a friendly action in a case where the similarity degree in the stroke history is high.

Furthermore, in FIGS. 6 and 7, an occurrence probability of the friendly action is defined to be always less than 100%, but this is merely an example. In a case where the similarity degree with the registered voice, the voice history, and the stroke history is high, the friendly action may be always performed.

Next, among the data stored in the storage unit 120, the emotion data 121, the emotion change data 122, the learning table 123, the operation content table 124, and a learning days data 125, which are data necessary for determining a normal action determined based on the learning value or the like, will be described in order.

Figure 8:
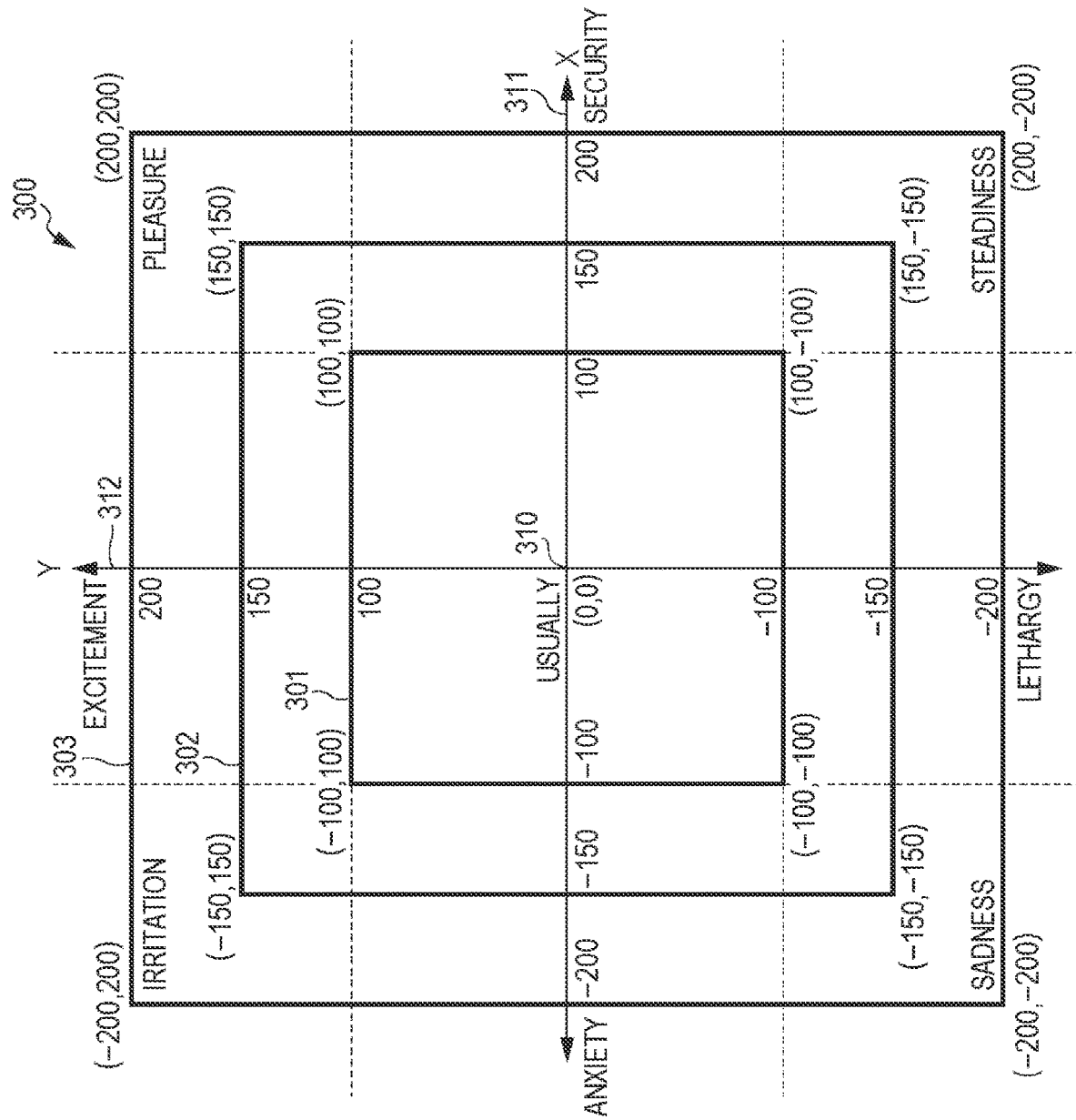
FIG. 8 is a diagram illustrating an example of an emotion map according to the embodiment.

The emotion data 121 is data for causing the robot 200 to have a pseudo emotion, and is data indicating coordinates on an emotion map 300 (X, Y). As illustrated in FIG. 8, the emotion map 300 is represented by a two-dimensional coordinate system having an axis of security degree (anxiety degree) as an X-axis 311 and an axis of excitement degree (lethargy degree) as a Y-axis 312. An origin 310 (0, 0) on the emotion map represents a normal emotion. Then, an emotion is expressed in which the greater the value of the X coordinate (X value) and the larger the absolute value thereof, the higher the security degree; and the greater the value of the Y coordinate (Y value) and the larger the absolute value thereof, the higher the excitement degree. In addition, the larger the absolute value with a negative X value, the higher the anxiety degree, and the larger the absolute value with a negative Y value, the higher the lethargy degree.

Note that, in FIG. 8, the emotion map 300 is represented by a two-dimensional coordinate system, but the number of dimensions of the emotion map 300 is arbitrary. The emotion map 300 may be defined one-dimensionally, and one value may be set as the emotion data 121. Furthermore, the emotion map 300 may be defined in a coordinate system of three or more dimensions by adding other axes, and a value of the number of dimensions of the emotion map 300 may be set as the emotion data 121.

In the present embodiment, the size of the emotion map 300 as an initial value is 100 as the maximum value and −100 as the minimum value for both the X value and the Y value as illustrated in a range 301 of FIG. 8. Furthermore, during a first period, every time the number of pseudo learning days of the robot 200 increases by one, both the maximum value and the minimum value of the emotion map 300 are enlarged by 2. Here, the first period is a period in which the robot 200 grows in a pseudo manner, and is, for example, a period of 50 days from the pseudo birth of the robot 200. Note that the pseudo birth of the robot 200 is the first activation by the user after factory shipping of the robot 200. When the number of learning days is 25, the maximum value of both the X value and the Y value is 150 and the minimum value thereof is −150 as illustrated in a range 302 of FIG. 8. Then, when the first period (50 days in this example) has elapsed, it is assumed that the pseudo learning of the robot 200 has been completed, and as illustrated in a range 303 of FIG. 8, the maximum value of both the X value and the Y value is 200 and the minimum value is −200, and the size of the emotion map 300 is fixed.

The emotion change data 122 is data for setting a change amount for increasing or decreasing each of the X value and the Y value of the emotion data 121. In the present embodiment, the emotion change data 122 corresponding to X of the emotion data 121 includes DXP for increasing the X value and DXM for decreasing the X value, and the emotion change data 122 corresponding to the Y value of the emotion data 121 includes DYP for increasing the Y value and DYM for decreasing the Y value. In other words, the emotion change data 122 includes the following four variables, and is data indicating a degree of changing the pseudo emotion of the robot 200.

DXP: an ease of security (an ease of changing the X value in positive direction of the emotion map)
DXM: an ease of anxiety (an ease of changing the X value in negative direction of the emotion map)
DYP: an ease of excitement (an ease of changing the Y value in positive direction of the emotion map)
DYM: an ease of lethargy (an ease of changing the Y value in negative direction of the emotion map)

In the present embodiment, as an example, the initial values of these variables are all set to 10, and are increased up to 20 by a process of learning the emotion change data in the operation control processing to be described later. Since the emotion change data 122, that is, the degree of change in emotion is changed according to this learning process, the robot 200 has various characters according to how the user interacts with the robot 200. In other words, personality of the robot 200 is formed differently depending on the way of interaction from the user.

Figure 9:
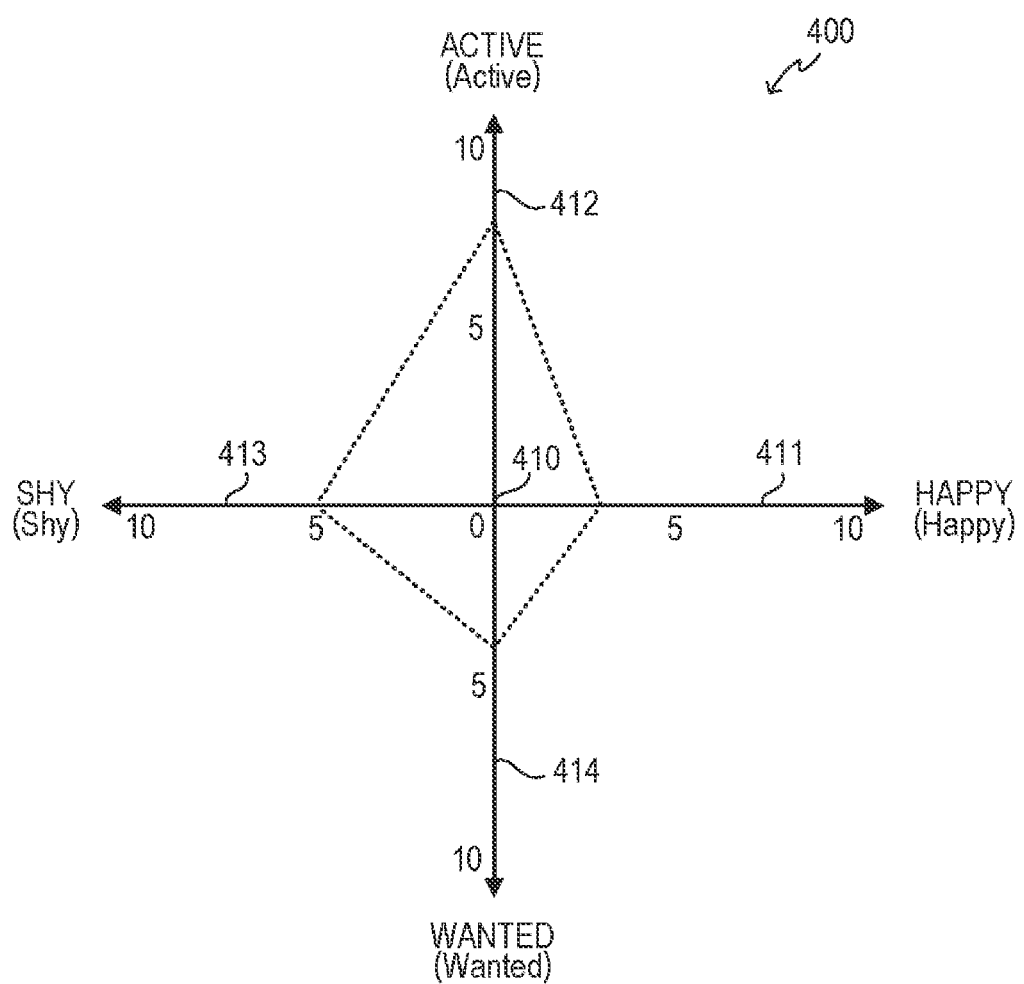
FIG. 9 is a drawing illustrating an example of a personality value radar chart according to the embodiment.

Therefore, in the present embodiment, each personality data (the personality value) is derived by subtracting 10 from each emotion change data 122. In other words, a value obtained by subtracting 10 from DXP indicating the ease of security is set as a personality value (happy), a value obtained by subtracting 10 from DXM indicating the ease of anxiety is set as a personality value (shy), a value obtained by subtracting 10 from DYP indicating the ease of excitement is set as a personality value (active), and a value obtained by subtracting 10 from DYM indicating the ease of lethargy is set as a personality value (wanted). As a result, for example, as illustrated in FIG. 9, a personality value radar chart 400 can be generated by plotting the personality value (happy) on an axis 411, plotting the personality value (active) on an axis 412, plotting the personality value (shy) on an axis 413, and plotting the personality value (wanted) on an axis 414.

Since an initial value of each personality value is 0, initial personality of the robot 200 is represented by an origin 410 of the personality value radar chart 400. Then, as the robot 200 grows, each personality value changes with 10 as an upper limit according to the outside stimuli or the like detected by the sensor unit 210 (how the user interacts with the robot 200). In a case where the four personality values change from 0 to 10 as in the present embodiment, 11 to the power of 4=14641 different personalities can be expressed.

In the present embodiment, the largest value among these four personality values is used as learning degree data (the learning value) indicating the pseudo learning degree of the robot 200. Then, the control unit 110 performs control in such a way that a variation occurs in the operation content of the robot 200 as the robot 200 pseudo learning (as the learning value increases). The data used by the control unit 110 for this purpose is the learning table 123.

As illustrated in FIG. 10, in the learning table 123, the type of the motion performed by the robot 200 according to motion trigger such as the outside stimuli detected by the sensor unit 210, and the probability of selecting each motion according to the learning value (hereinafter referred to as "motion selection probability") are recorded. Note that the motion trigger is information such as the outside stimuli that have triggered the robot 200 to perform certain motions. Then, the motion selection probability is set in such a way that the basic motions set according to the motion triggers are selected regardless of the personality values while the learning value is small, and the personality motions set according to the personality values are selected when the learning value increases. In addition, the motion selection probability is set in such a way that the types of the basic motions that can be selected increase as the learning value increases.

For example, as illustrated in FIG. 9, it is assumed that the current personality value of the robot 200 is 3 as the personality value (happy), 8 as the personality value (active), 5 as the personality value (shy), and 4 as the personality value (wanted), and a big sound is detected by the microphone 214. In this case, the learning value is 8, which is the maximum value among the four personality values, and the motion trigger is "loud sound". Then, referring to the items with a learning value of 8 in the learning table 123 illustrated in FIG. 10 where the motion trigger is "loud sound", it can be seen that the motion selection probability is 20% for the "basic motion 2-0", 20% for the "basic motion 2-1", 40% for the "basic motion 2-2", and 20% for the "character motion 2-0".

In other words, in this case, the "basic motion 2-0" is selected with a probability of 20%, the "basic motion 2-1" is selected with a probability of 20%, the "basic motion 2-2" is selected with a probability of 40%, and the "character motion 2-0" is selected with a probability of 20%. Then, in a case where the "character motion 2-0" is selected, one of the four types of character motions as illustrated in FIG. 11 is further selected according to the four character values. Then, the robot 200 executes the motion selected here.

Note that, in FIG. 10, one character motion is selected for each motion trigger, but similarly to the basic motion, the types of character motions to be selected may be increased according to an increase in the character values. In addition, the contents of FIGS. 6 and 7 may be integrated with the contents of FIG. 10 to set a defined learning table including the friendly action among the motion types.

In addition, the form of the learning table 123 is arbitrary as long as it can be defined as a function (a learning function) that returns the motion selection probability of each operation type using a learning value as an argument for each motion trigger, and the learning table does not have to be tabular data as illustrated in FIG. 10.

As illustrated in FIG. 11, the operation content table 124 is a table in which specific operation contents of each operation type defined in the learning table 123 is recorded. However, regarding the character motion, the operation content is defined for each character type. Note that the operation content table 124 does not have to be in data form. For example, when the learning table 123 is configured in such a way that the specific operation contents are directly recorded in the items of the operation type of the learning table 123, the operation content table 124 is unnecessary.

The learning days data 125 has an initial value of 1, and 1 is added every time one day passes. The learning days data 125 indicates the pseudo learning days (days from the pseudo birth) of the robot 200. In the present embodiment, the period of learning days represented by the learning days data 125 is referred to as a second period.

Next, the operation control processing executed by the control unit 110 of the robot 200 will be described with reference to a flowchart illustrated in FIG. 12. The operation control processing is a process in which the control unit 110 controls operations (movements, cry, or the like) of the robot 200 based on detection values or the like from the sensor unit 210. When the user turns on the robot 200, the thread of the operation control processing starts to be executed in parallel with other necessary processing. The drive unit 220 and the output unit 230 (the sound output unit) are controlled by the operation control processing, and the movements of the robot 200 are expressed or a sound such as a cry is output.

First, the control unit 110 initializes various data such as the emotion data 121, the emotion change data 122, and the learning days data 125 (step S101). Various variables (BigSound_Flag, TalkSound_Flag, Talk owner registration_Flag, Talk "definite" level_Flag, Talk "perhaps" level_Flag, Talk "possible" level_Flag, Talk repetition_Flag, Talk normal action_Flag, Touch_Flag, Touch "definite" level_Flag, Touch "perhaps" level_Flag, Touch "possible" level_Flag, etc.) to be used in the present embodiment are also initialized to OFF or 0 in step S101.

Furthermore, the control unit 110 executes the microphone input processing of acquiring the outside stimuli from the microphone 214 (step S102). Details of the microphone input processing will be described later. Next, the control unit 110 executes the stroke input processing of acquiring the outside stimuli from the stroke sensor 211 or the acceleration sensor 212 (step S103). Details of the stroke input processing will also be described later. Note that, in the present embodiment, the microphone input processing and the stroke input processing are described as separate processing for easy understanding of the description, but processing of acquiring the outside stimuli from various sensors included in the sensor unit 210 may be executed as one processing (an external input processing).

Then, the control unit 110 determines whether there is any outside stimuli detected by the sensor unit 210 (step S104). When there are outside stimuli, BigSound_Flag, TalkSound_Flag, or Touch_Flag is turned ON by the microphone input processing and the stroke input processing described above, and thus the control unit 110 can make a determination in step S104 based on the values of these flag variables.

When there are outside stimuli (step S104; Yes), the control unit 110 acquires the emotion change data 122 to be added to or subtracted from the emotion data 121 according to the outside stimuli acquired in the microphone input processing and the stroke input processing (step S105). Specifically, for example, when detecting that the head portion 204 is stroked by the stroke sensor 211 of the head portion 204 as the outside stimuli, the robot 200 obtains a pseudo sense of security, and thus the control unit 110 acquires DXP as the emotion change data 122 to be added to the X value of the emotion data 121.

Then, the control unit 110 sets the emotion data 121 according to the emotion change data 122 that has been acquired in step S105 (step S106). Specifically, for example, when DXP has been acquired as the emotion change data 122 in step S105, the control unit 110 adds DXP of the emotion change data 122 to the X value of the emotion data 121. However, in a case where the value of the emotion data 121 (the X value and the Y value) exceeds the maximum value of the emotion map 300 when the emotion change data 122 is added, the value of the emotion data 121 is set to the maximum value of the emotion map 300. Furthermore, in a case where the value of the emotion data 121 is less than the minimum value of the emotion map 300 when the emotion change data 122 is subtracted, the value of the emotion data 121 is set to the minimum value of the emotion map 300.

Although it is possible to arbitrarily set what kind of emotion change data 122 is acquired and the emotion data 121 is set for each of the outside stimuli in steps S105 and S106, an example will be described below. Note that, since the maximum values and the minimum values of the X value and the Y value of the emotion data 121 are defined by the size of the emotion map 300, the maximum values are set in a case where the X value and the Y value exceed the maximum value of the emotion map 300 by the following calculation, and the minimum values are set in a case where the X value and the Y value are below the minimum value of the emotion map 300.

The head portion 204 is stroked (causing security): X=X+DXP

The head portion 204 is pat (causing anxiety): X=X−DXM (These outside stimuli can be detected by the stroke sensor 211 of the head portion 204)

The body portion 206 is stroked (causing excitement): Y=Y+DYP

The body portion 206 is pat (causing lethargy): Y=Y−DYM (These outside stimuli can be detected by the stroke sensor 211 of the body portion 206)

The robot is held in a head up posture (showing pleasure): X=X+DXP and Y=Y+DYP

The robot is in a head-down state (showing sadness): X=X−DXM and Y=Y−DYM (These outside stimuli can be detected by the stroke sensor 211 and the acceleration sensor 212)

The robot is called with a gentle voice (causing steadiness): X=X+DXP and Y=Y−DYM The robot is yelled with a loud voice (causing irritation): X=X−DXM and Y=Y+DYP (These outside stimuli can be detected by the microphone 214.)

Then, the control unit 110 determines whether there is any outside stimulus such as a stroke in the stroke input processing (step S107). Specifically, the control unit 110 may determine whether Touch_Flag is ON. When there is a stroke or the like (step S107; Yes), the control unit 110 executes a stroke response processing (step S108). Details of the stroke response processing will be described later. Then, the control unit 110 substitutes OFF for the variable Touch_Flag (step S109), and proceeds to step S119.

On the other hand, when there is no outside stimuli such as a stroke in the stroke input processing (step S107; No), the control unit 110 determines whether there is any voice as the outside stimuli in the microphone input processing (step S110). Specifically, it may be determined whether TalkSound_Flag is ON. When there is any voice (step S110; Yes), the control unit 110 executes the voice response processing (step S111). Details of the voice response processing will be described later. Then, the control unit 110 substitutes OFF into the variable TalkSound_Flag (step S112), and proceeds to step S119.

On the other hand, when there is no voice as the outside stimuli in the microphone input processing (step S110; No), the control unit 110 determines whether there is a loud sound as the outside stimuli in the microphone input processing (step S113). Specifically, it may be determined whether BigSound_Flag is ON. When there is a loud sound (step S113; Yes), the control unit 110 executes an operation of reacting to the loud sound (step S114). In other words, the control unit 110 executes an operation (basic motion 2-0 or the like) corresponding to "loud sound" as the motion trigger of the learning table 123 illustrated in FIG. 10. Then, the control unit 110 substitutes OFF into the variable BigSound_Flag (step S115), and proceeds to step S119.

On the other hand, when there is no loud sound as the outside stimuli in the microphone input processing (step S113; No), the control unit 110 executes another operation (when there is a motion trigger corresponding to the outside stimuli acquired by the microphone input processing or the stroke input processing in the learning table 123, the operation corresponding to the motion trigger is performed) according to the outside stimuli (step S116), and proceeds to step S119.

On the other hand, when there is no outside stimuli in step S104 (step S104; No), the control unit 110 determines whether to perform a voluntary motion such as a breathing motion (step S117). A method of determining whether to perform the voluntary motion is arbitrary, but in the present embodiment, it is assumed that the determination in step S117 is Yes and the breathing motion is performed along with every breathing cycle (for example, 2 seconds).

When the voluntary motion is performed (step S117; Yes), the control unit 110 performs the voluntary motion (for example, the breathing motion) (step S118), and proceeds to step S119.

When the voluntary action is not performed (step S117; No), the control unit 110 determines whether the date has changed through the clock function (step S119). When the date has not changed (step S119; No), the control unit 110 returns to step S102.

When the date has changed (step S119; Yes), the control unit 110 determines whether it is during the first period (step S120). Assuming that the first period is, for example, 50 days from the pseudo birth of the robot 200 (for example, at the time of first activation by the user after purchase), the control unit 110 determines that the robot is during the first period when the learning days data 125 is 50 or less. When it is not during the first period (step S120; No), the control unit 110 proceeds to step S122.

When it is during the first period (step S120; Yes), the control unit 110 learns the emotion change data 122 and expands the emotion map (step S121). Specifically, the learning of the emotion change data 122 is processing of updating the emotion change data 122, by adding 1 to DXP of the emotion change data 122 when the X value of the emotion data 121 is set to the maximum value of the emotion map 300 even once, by adding 1 to DYP of the emotion change data 122 when the Y value of the emotion data 121 is set to the maximum value of the emotion map 300 even once, by adding 1 to DXM of the emotion change data 122 when the X value of the emotion data 121 is set to the minimum value of the emotion map 300 even once, and by adding 1 to DYM of the emotion change data 122 when the Y value of the emotion data 121 is set to the minimum value of the emotion map 300 even once in step S106 on that day.

However, when each value of the emotion change data 122 becomes too large, one change amount of the emotion data 121 becomes too large, and therefore, each value of the emotion change data 122 is set to the maximum value of 20, for example, and is limited to or less than the maximum value. Furthermore, here, 1 is added to any of the emotion change data 122, but the value to be added is not limited to 1. For example, the number of times each value of the emotion data 121 is set to the maximum value or the minimum value of the emotion map 300 is counted, and in a case where the number of times is large, a numerical value to be added to the emotion change data 122 may be increased.

Figure 12:
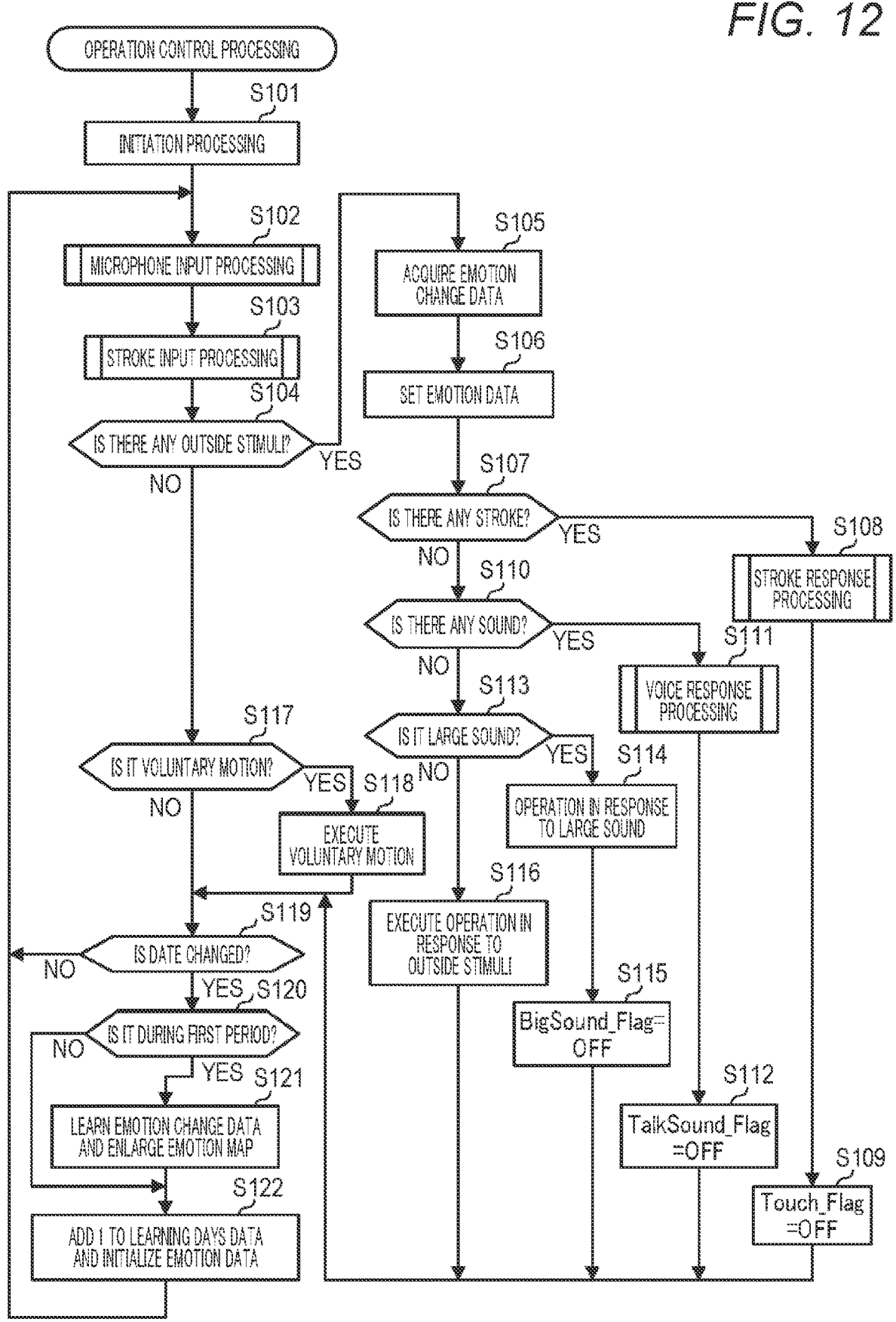
FIG. 12 is a flowchart of operation control processing according to the embodiment.

Returning to step S121 in FIG. 12, an enlargement of the emotion map is specifically processing in which the control unit 110 enlarges the emotion map 300 by 2, for both the maximum value and the minimum value. However, this enlarged numerical value "2" is merely an example, and may be enlarged by three or more, or may be enlarged by one. In addition, the enlarged numerical values may not be the same for each axis of the emotion map 300 or between the maximum value and the minimum value.

Then, the control unit 110 adds 1 to the learning days data 125, initializes the emotion data to 0 for both the X value and the Y value (step S122), and returns to step S102.

Figure 13:
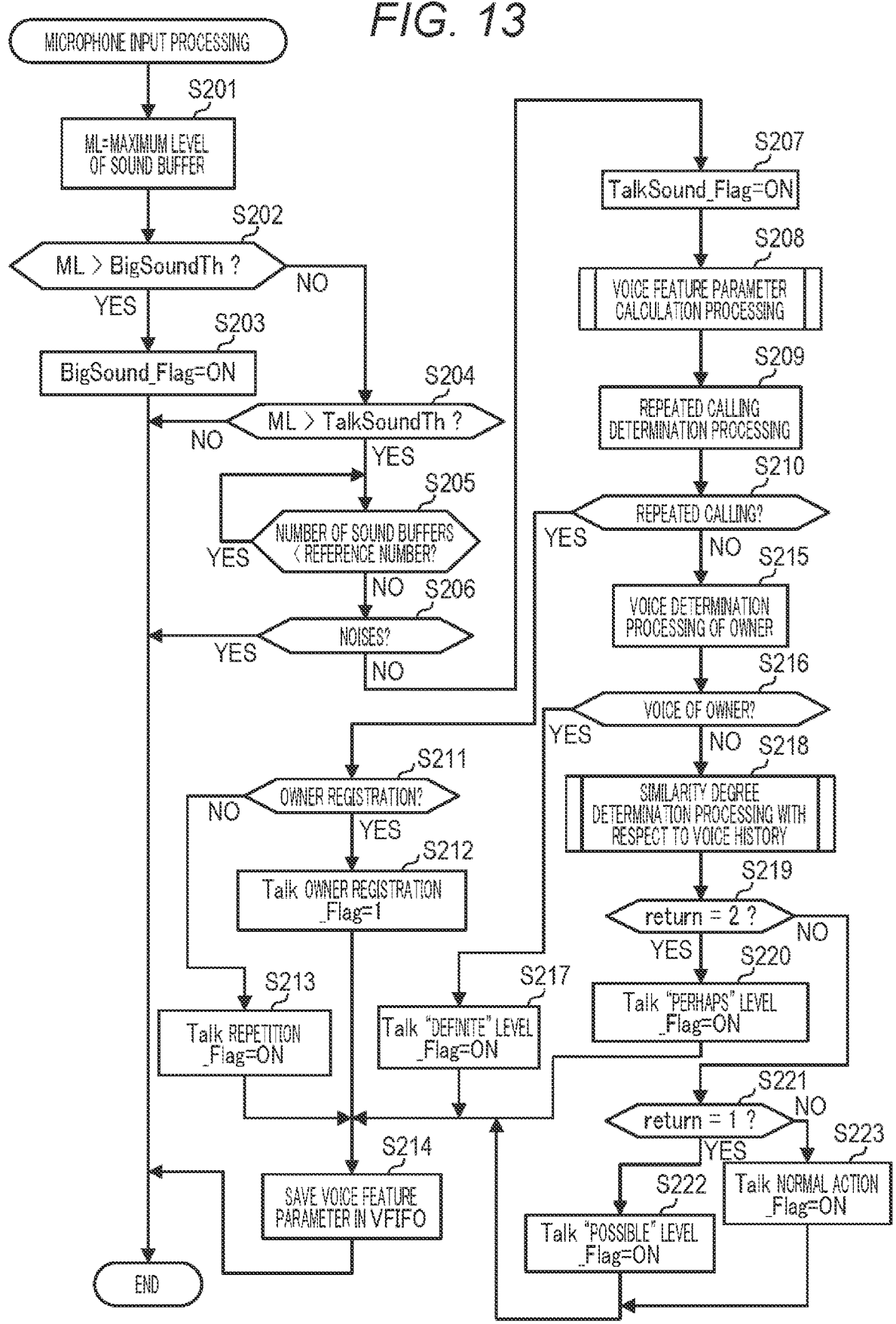
FIG. 13 is a flowchart of microphone input processing according to the embodiment.

Next, the microphone input processing executed in step S102 of the operation control processing described above will be described with reference to FIG. 13.

To start with, the control unit 110 substitutes the maximum level in the sampling data in the sound buffers into the variable ML (step S201). Then, the control unit 110 determines whether the value of the variable ML is larger than BigSoundTh (step S202). Furthermore, in BigSoundTh, a value (a big sound threshold) at which the robot 200 performs a surprising motion for a sound larger than this is set in advance. When the variable ML is larger than BigSoundTh (step S202; Yes), the control unit 110 turns on the variable BigSound_Flag indicating that a big sound has been input (step S203), terminates the microphone input processing, and proceeds to step S103 of the operation control processing.

On the other hand, when the variable ML is less than or equal to BigSoundTh (step S202; No), the control unit 110 determines whether the value of the variable ML is larger than TalkSoundTh. Note that, in TalkSoundTh, a value (a speech threshold value) that the robot 200 cannot hear as voice when the sound is equal to or less than this is set in advance. When the variable ML is TalkSoundTh or less (step S204; No), the control unit 110 ignores the current sound of the sound buffer, terminates the microphone input processing, and proceeds to step S103 of the operation control processing.

On the other hand, when the variable ML is larger than TalkSoundTh (step S204; Yes), the control unit 110 determines whether the number of sound buffers storing the sound data is less than a reference number (16 in this case) (step S205). When the number of sound buffers is less than the reference number (step S205; Yes), the control unit 110 returns to step S205 and waits until the reference number of sound buffers are saved.

On the other hand, when the number of sound buffers reaches the reference number (step S205; No), the control unit 110 determines whether the sounds stored in the reference number of sound buffers are noises (step S206). In the case of voice, a sound at a higher level than TalkSoundTh is generated for a certain period of time (for example, 0.1 seconds or more), but in the case of noises, the sound is often a single instantaneous sound. Therefore, the control unit 110 can determine whether the sound stored in the sound buffer is noises by using such sound properties.

For example, to start with, the control unit 110, to determine number of noise determinations among the sound buffers of reference number (it is 3 in the present embodiment; in other words, for the sound buffer [0], the sound buffer [1], and the sound buffer [2]), determines whether the maximum level in the sampling data in each sound buffer is larger than TalkSoundTh. When at least one sound buffer whose maximum level is equal to or lower than TalkSoundTh is present, it is determined that the sound of the sound buffer currently stored at the reference number is noises, and when the maximum levels of all the sound buffers (in other words, each of the sound buffer [0], the sound buffer [1], and the sound buffer [2]) of the number of noise determinations are larger than TalkSoundTh, it is determined that the sound is not noises.

Referring back to FIG. 13, when the sounds stored at the reference number of sound buffers are noises (step S206; Yes), the control unit 110 ignores the sounds at the current reference number of sound buffers (determines that there is no outside stimuli of a sound that serves as the motion trigger), terminates the microphone input processing, and proceeds to step S103 of the operation control processing.

On the other hand, when the sounds stored in the reference number of sound buffers are not noises (step S206; No), the control unit 110 substitutes ON into the variable Talk-Sound_Flag indicating that the voice has been input (step S207), and performs the voice feature parameter calculation processing (step S208). The voice feature parameter calculation processing is processing of calculating the voice feature parameter by calculating the cepstrum from the sampling data stored in the sound buffers, and details thereof will be described later.

Next, the control unit 110 performs a repeated calling determination processing (step S209). The repeated calling determination processing is processing of determining whether a repeated calling has been made by comparing the voice feature parameters (the voice feature parameters acquired at the timing of performing this processing) calculated in the voice feature parameter calculation processing with the voice history corresponding to the latest number of consecutive determination storages (3 in the present embodiment), and returning the determination results.

Specifically, the control unit 110 calculates the distance (L2 norm) between the speech feature parameters acquired at the timing of performing this processing and each of the latest three speech feature parameters in the voice history, and determines that it is the "repeated calling" when there are two or more of the calculated three distances that are less than VsimTh (set in advance as a voice similarity threshold), and determines that it is not the "repeated calling" when there are one or less distances that are less than VsimTh. In addition, the voice history corresponding to the latest number of latest consecutive determination storages is also referred to as continuous determination feature amounts.

Then, the control unit 110 determines whether the determination results of the repeated calling determination processing are "repeated calling" (step S210). When the calling is a repeated calling (step S210; Yes), the control unit 110 determines whether the owner is registered (step S211). Specifically, in this determination, when it is within the registration time (for example, within 3 minutes) from the first power-on of the robot 200 and the variable Talk owner registration_Flag is 0, the control unit 110 determines that it is the owner registration and determines that it is not the owner registration when the registration time has passed or the variable Talk owner registration_Flag is not 0.

In a case of the owner registration (step S211; Yes), the control unit 110 substitutes 1 into the variable Talk owner registration_Flag (step S212), and proceeds to step S214. When the owner is not registered (step S211; No), the control unit 110 turns on the variable Talk repetition_Flag (step S213), and proceeds to step S214. Furthermore, in step S214, the control unit 110 stores the voice feature parameters calculated in step S208 in the voice history (VFIFO) by the first-in first-out method (step S214). Then, the control unit 110 ends the microphone input processing and proceeds to step S103 of the operation control processing.

On the other hand, when the control unit 110 determines in step S210 that the calling is not a repeated calling (step S210; No), the control unit 110 performs owner's voice determination processing (step S215). The owner's voice determination processing is processing of determining whether the voice is the owner's voice by comparing the voice feature parameters calculated in the voice feature parameter calculation processing with the voice feature parameters of the voice (registered voice) registered as the owner, and returning the determination results. Specifically, the control unit 110 calculates the distance (L2 norm) between the voice feature parameters calculated in step S208 and the voice feature parameters of the registered voice, and when the calculated distance is less than VsimTh (the voice similarity threshold), it is determined as "owner's voice", and when the calculated distance is equal to or more than VsimTh, it is determined as not "owner's voice".

Then, the control unit 110 determines whether the determination result of the owner's voice determination processing is "owner's voice" (step S216). When it is the owner's voice (step S216; Yes), ON is substituted into the variable Talk "definite" level_Flag indicating that the robot 200 has recognized that the voice is definitely the owner's voice (step S217), and the processing proceeds to step S214.

When it is not the owner's voice (step S216; No), the control unit 110 performs similarity degree determination processing with respect to the voice history (step S218). The processing of similarity degree determination processing to the voice history is processing of comparing the voice feature parameters calculated in the voice feature parameter calculation processing with the voice history to obtain similarity degree, and returning an integer from 0 to 2 (0=no similarity degree, 1=intermediate similarity degree, 2=high similarity degree) in accordance with the similarity degree; and details thereof will be described later.

Then, the control unit 110 determines whether the result returned in the similarity degree determination processing with respect to the voice history is 2 (in other words, high similarity degree) (step S219). When the returned value is 2 (step S219; Yes), the control unit 110 substitutes ON into the variable Talk "perhaps" level_Flag indicating that the robot 200 has recognized that the voice is perhaps the owner (step S220), and proceeds to step S214.

When the result returned in the similarity degree determination processing with respect to the voice history is not 2 (step S219; No), the control unit 110 determines whether the result returned in the similarity degree determination processing with respect to the voice history is 1 (in other words, intermediate similarity degree) (step S221). When the returned value is 1 (step S221; Yes), the control unit 110 substitutes ON into the variable Talk "possible" level_Flag indicating that the robot 200 has recognized that the voice may be the owner (step S222), and proceeds to step S214.

When the result returned in the similarity degree determination processing with respect to the voice history is not 1 (in other words, "no similarity degree") (step S221; No), the control unit 110 substitutes ON into the variable Talk normal action_Flag, indicating that the normal action is to be performed (step S223), and proceeds to step S214.

Figure 14:
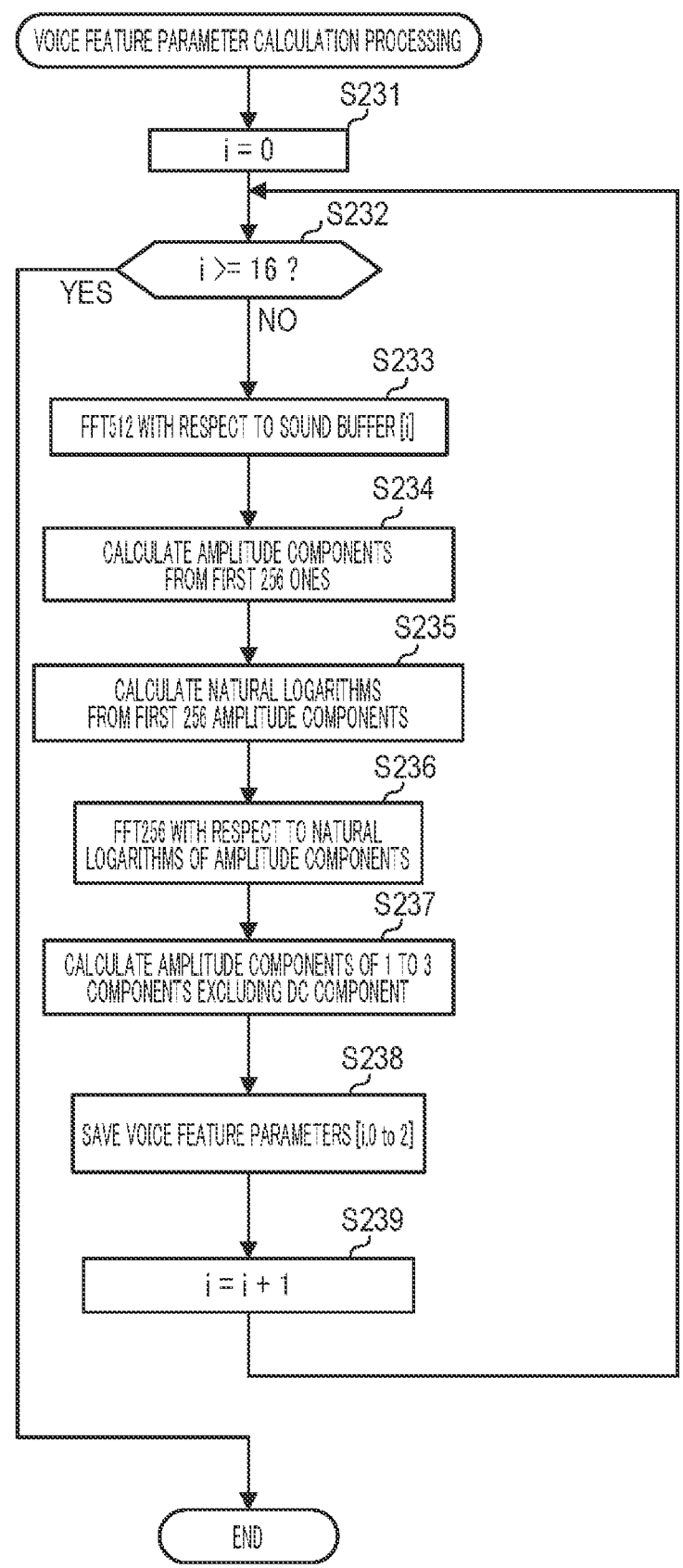
FIG. 14 is a flowchart of voice feature parameter calculation processing according to the embodiment.

Next, the voice feature parameter calculation processing executed in step S208 of the microphone input processing will be described with reference to FIG. 14.

To start with, the control unit 110 initializes a variable i for designating each element (the sound buffer [0] to the sound buffer [15]) of the sound buffers as the array variables to 0 (step S231). Then, the control unit 110 determines whether the variable i is 16 or more (step S232). When the variable i is 16 or more (step S232; Yes), the control unit 110 ends the voice feature parameter calculation processing and proceeds to step S209 of the microphone input processing.

When the variable i is less than 16 (step S232; No), the control unit 110 performs fast Fourier transform (FFT) on 512 samples included in a sound buffer [i] (step S233). Then, the control unit 110 calculates first 256 amplitude components (a frequency spectrum of the voice data) obtained by FFT (step S234). Here, assuming that the amplitude components are stored in the variables $\alpha[0]$ to $\alpha[255]$, the control unit 110

$$\alpha[n]=\sqrt{(\text{square of } n^{th} \text{ real component} + \text{square of } n^{th} \text{ imaginary component})}$$

(where n is 0 to 255)
is calculated.

Next, the control unit 110 calculates natural logarithm of each of the 256 amplitude components (step S235). Here, assuming that the natural logarithms is stored in the variables $\beta[0]$ to $\beta[255]$, the control unit 110 is specifically configured to calculate:

$$\beta[n]=\ln(\alpha[n])$$

(where n is 0 to 255).

Next, the control unit 110 performs FFT again on the calculated 256 natural logarithms (step S236). Then, the control unit 110 calculates the amplitude components at the reference number (3 in the present embodiment) of components excluding the DC component (the first one at the very beginning) from the beginning among the components obtained by the FFT (step S237). Here, since the cepstrum is obtained, when the cepstrum is stored in the variables Cps[0] to Cps[2], the control unit 110 is specifically configured to calculate:

$$\text{Cps}[n-1]=\sqrt{(\text{square of } n^{th} \text{ real component} + \text{square of } n^{th} \text{ imaginary component})}$$

(where n is 1 to 3).

Next, the control unit 110 stores the calculated three cepstrums as the voice feature parameters (step S238). Here, assuming that the voice feature parameters are stored in the array variables VF[i,n], the control unit 110 is specifically configured to execute:

$$\text{VF}[i,n]=\text{Cps}[n]$$

(where n is 0 to 2). Then, the control unit 110 adds 1 to the variable i (step S239), and returns to step S232.

By the voice feature parameter calculation processing described above, the voice feature parameters (VF[0,0] to VF[15,2]) having elements of 16×3=48 are obtained.

Figure 15:
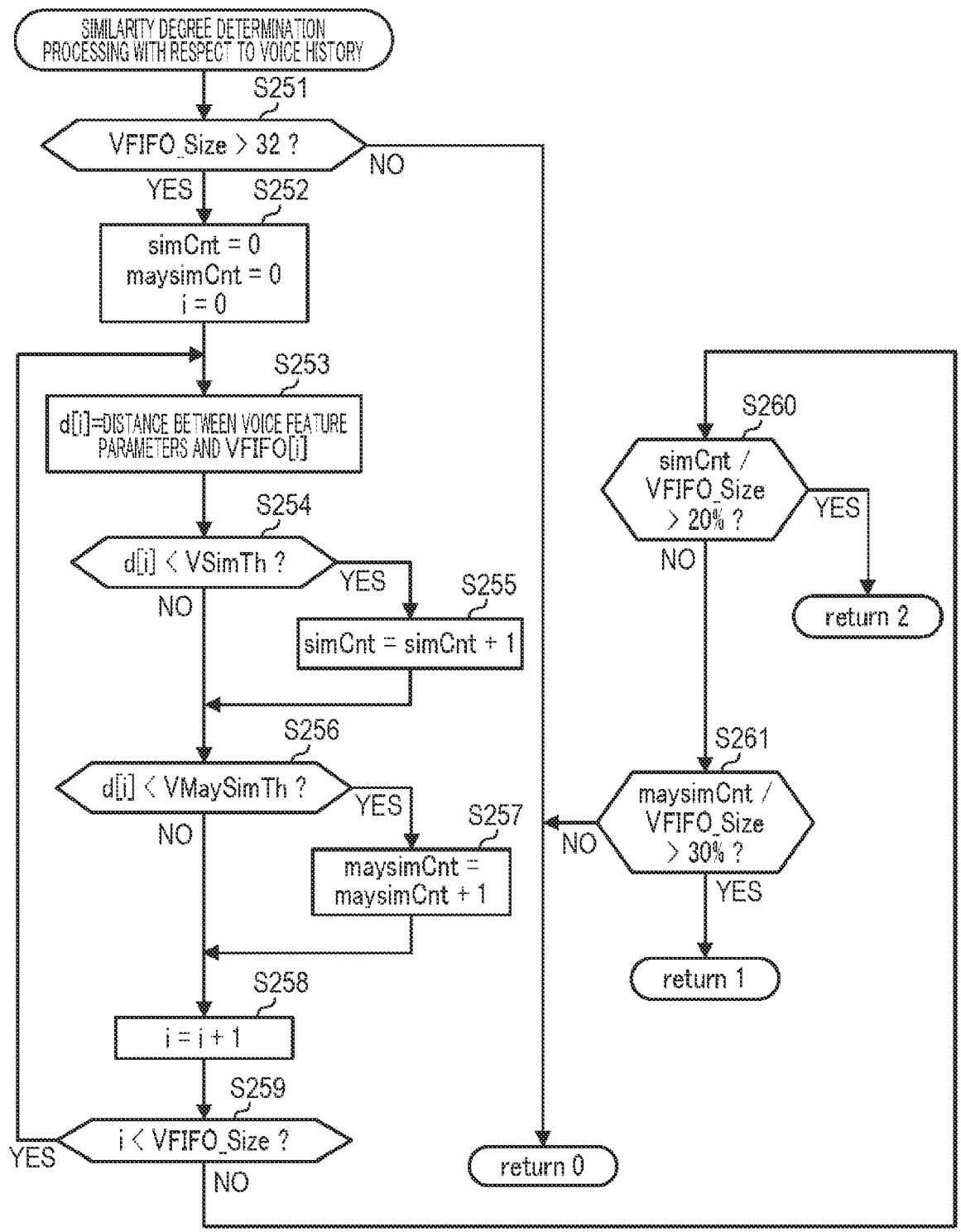
FIG. 15 is a flowchart of similarity degree determination processing with respect to a voice history according to the embodiment.

Next, similarity degree determination processing with respect to the voice history executed in step S218 of the microphone input processing will be described with reference to FIG. 15.

To start with, the control unit 110 determines whether the variable VFIFO_Size in which the number of voice history storage is stored is larger than the minimum voice reference number (32 in the present embodiment) (step S251). When VFIFO_Size is equal to or smaller than the minimum voice reference number (step S251; No), sufficient similarity degree determination cannot be performed, and thus the control unit 110 terminates the similarity degree determination processing with respect to the voice history with "0" (representing no similarity) as a return value, and proceeds to step S219 of the microphone input processing.

When VFIFO_Size is larger than the minimum voice reference number (step S251; Yes), the control unit 110 initializes a variable simCnt for counting the number of voice histories having high similarity degree, a variable maysimCnt for counting the number of voice histories having median similarity, and the variable i for designating each element (VFIFO [0] to VFIFO [VFIFO_Size−1]) of the voice history VFIFO as the array variables to 0 (step S252).

Then, the control unit 110 calculates a distance (L2 norm) between the voice feature parameters calculated in step S208 and VFIFO [i] and substitutes the distance into a variable d[i] (step S253). Then, the control unit 110 determines whether the value of the variable d[i] is less than VSimTh (the voice similarity threshold) (step S254). When d[i] is less than VSimTh (step S254; Yes), the control unit 110 adds 1 to the variable simCnt (step S255), and proceeds to step S256. When d[i] is equal to or more than VSimTh (step S254; No), the process proceeds to step S256.

Then, in step S256, the control unit 110 determines whether the value of the variable d[i] is less than VMaySimTh (a voice middle similarity threshold). Note that, as VMaySimTh (the voice middle similarity threshold), a value larger than VSimTh (the voice similarity threshold) is set in advance. When d[i] is less than VMaySimTh (step S256; Yes), the control unit 110 adds 1 to the variable maysimCnt (step S257), and proceeds to step S258. When d[i] is equal to or more than VMaySimTh (step S256; No), the process proceeds to step S258.

In step S258, the control unit 110 adds 1 to the variable i. Then, the control unit 110 determines whether the value of the variable i is less than the variable VFIFO_Size (step S259). When the variable i is less than VFIFO_Size (step S259; Yes), the control unit 110 returns to step S253.

When the variable i is equal to or larger than VFIFO_Size (step S259; No), the control unit 110 determines whether the ratio of the variable simCnt to the variable VFIFO_Size exceeds 20% (step S260). When the ratio of the variable simCnt to the variable VFIFO_Size exceeds 20% (step S260; Yes), since the similarity degree between the voice feature parameters calculated in step S208 and the voice history is high, the control unit 110 ends the similarity degree determination processing with respect to the voice history with "2" as the return value, and proceeds to step S219 of the microphone input processing.

On the other hand, when the ratio of the variable simCnt to the variable VFIFO_Size is 20% or less (step S260; No), the control unit 110 determines whether the ratio of the variable maysimCnt to the variable VFIFO_Size exceeds 30% (step S261). When the ratio of the variable maysimCnt to the variable VFIFO_Size exceeds 30% (step S261; Yes), since the similarity degree between the voice feature parameters calculated in step S208 and the voice history is median, the control unit 110 ends the similarity degree determination processing with respect to the voice history with "1" as the return value, and proceeds to step S219 of the microphone input processing.

On the other hand, when the ratio of the variable maysimCnt with respect to the variable VFIFO_Size is 30% or less (step S261; No), since the voice feature parameters calculated in step S208 is not similar to the voice history, the control unit 110 ends the similarity degree determination processing with the voice history with "0" as the return value, and proceeds to step S219 of the microphone input processing. Note that comparison with "20%" and "30%" in the above determination is merely an example, and can be changed as necessary together with VSimTh and VMaySimTh.

Figure 16:
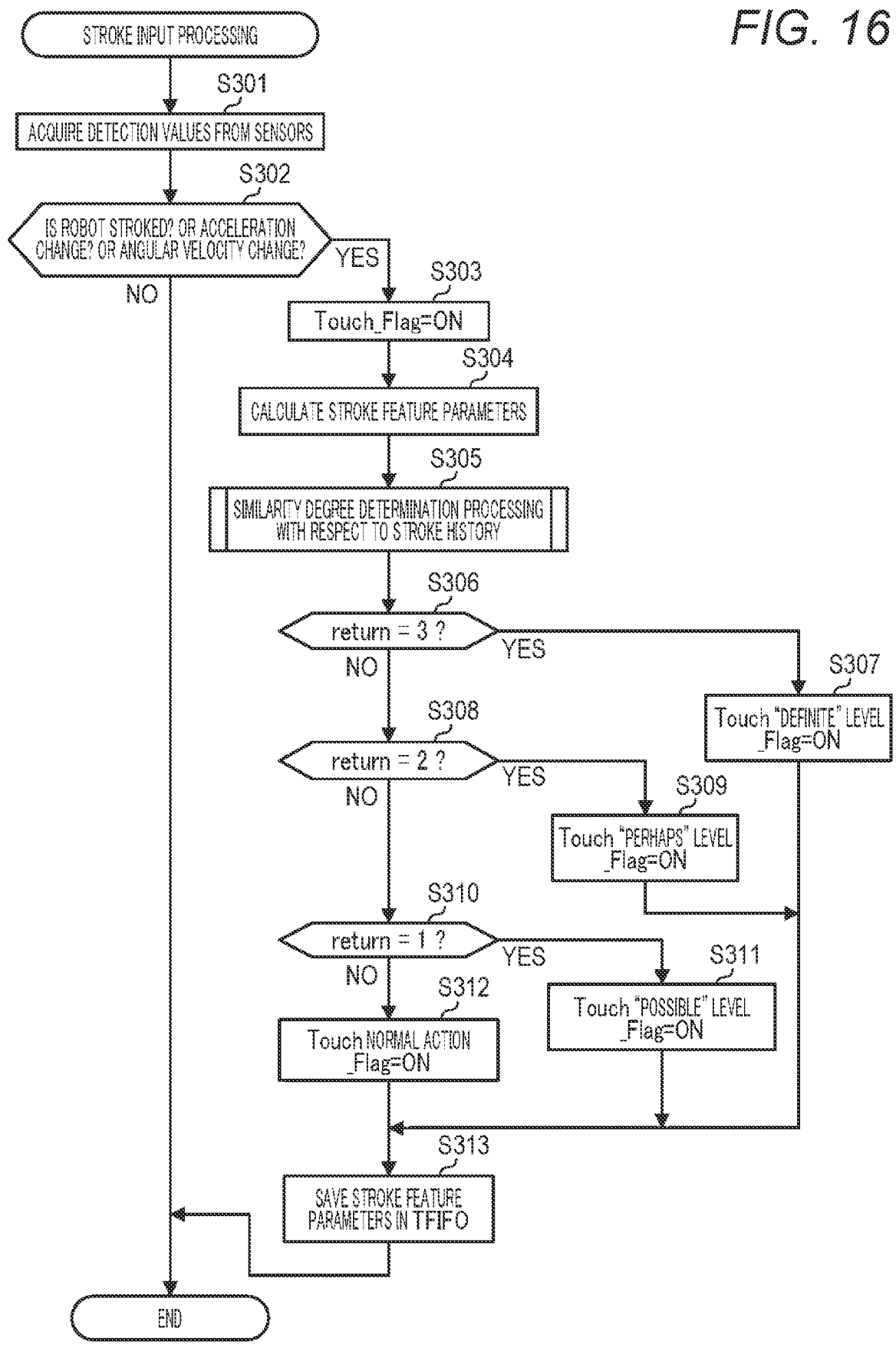
FIG. 16 is a flowchart of stroke input processing according to the embodiment.

Next, the stroke input processing executed in step S103 of the operation control processing will be described with reference to FIG. 16.

To start with, the control unit 110 acquires detection values detected by the respective sensors from the stroke sensor 211, the acceleration sensor 212, and the gyro sensor 213 (step S301). Then, based on the detection values, the control unit 110 determines whether the stroke sensor 211 has detected a stroke, the acceleration detected by the acceleration sensor 212 has changed, or the angular velocity detected by the gyro sensor has changed (step S302).

When there is a stroke, an acceleration change, or an angular velocity change (step S302; Yes), the control unit 110 turns on the variable Touch_Flag (step S303), and calculates the stroke feature parameters (step S304). As described above, the stroke feature parameters include 5-dimensional information of the posture (dir) of the robot 200, the stroke intensity of the head portion (touch_Head), the stroke intensity of the left side surface (touch_Left), the stroke intensity of the right side surface (touch_Right), and the vibration intensity (gyro_Level).

Then, the control unit 110 performs similarity degree determination processing with respect to the stroke history (step S305). The similarity degree determination processing with respect to the stroke history is processing of comparing the stroke feature parameters calculated in step S304 with the stroke history to obtain the similarity degree, and returning an integer from 0 to 3 (0=no similarity degree, 1=intermediate similarity degree, 2=high similarity degree, 3=very high similarity degree) according to the similarity degrees, and details will be described later. Then, the control unit 110 determines whether the result returned in the similarity degree determination processing with respect to the stroke history is 3 (step S306). When the returned value is 3 (step S306; Yes), the control unit 110 substitutes ON into the variable Touch "definite" level_Flag indicating that the robot 200 has recognized that the way of stroking (stroking method) is the person who always takes care of the robot (step S307), and proceeds to step S313.

When the value returned in the similarity degree determination processing with respect to the stroke history is not 3 (step S306; No), the control unit 110 determines whether the value returned in the similarity degree determination processing with respect to the stroke history is 2 (step S308). When the returned value is 2 (step S308; Yes), the control unit 110 substitutes ON into the variable Touch "perhaps" level_Flag indicating that the robot 200 has recognized that the way of stroking (stroking method) is probably from a person who always takes care of the robot (step S309), and proceeds to step S313.

When the value returned in the similarity degree determination processing with respect to the stroke history is not 2 (step S308; No), the control unit 110 determines whether the value returned in the similarity degree determination processing with respect to the stroke history is 1 (step S310). When the returned value is 1 (step S310; Yes), the control unit 110 assigns ON to the variable Touch "possible" level_Flag indicating that the robot 200 has recognized that the way of stroking (stroking method) may be from a person who always takes care of the robot (step S311), and proceeds to step S313.

When the value returned in the similarity degree determination processing with respect to the stroke history is not 1 (step S310; No), since the stroke feature parameters calculated in step S304 are not similar to the stroke history, the control unit 110 substitutes ON for a variable Touch normal action_Flag indicating that the normal action is performed (step S312), and proceeds to step S313.

In step S313, the control unit 110 stores the stroke feature parameters calculated in step S304 in the stroke history (TFIFO) by the first-in first-out method (step S313). Then, the control unit 110 ends the stroke input processing and proceeds to step S104 of the operation control processing.

Figure 17:
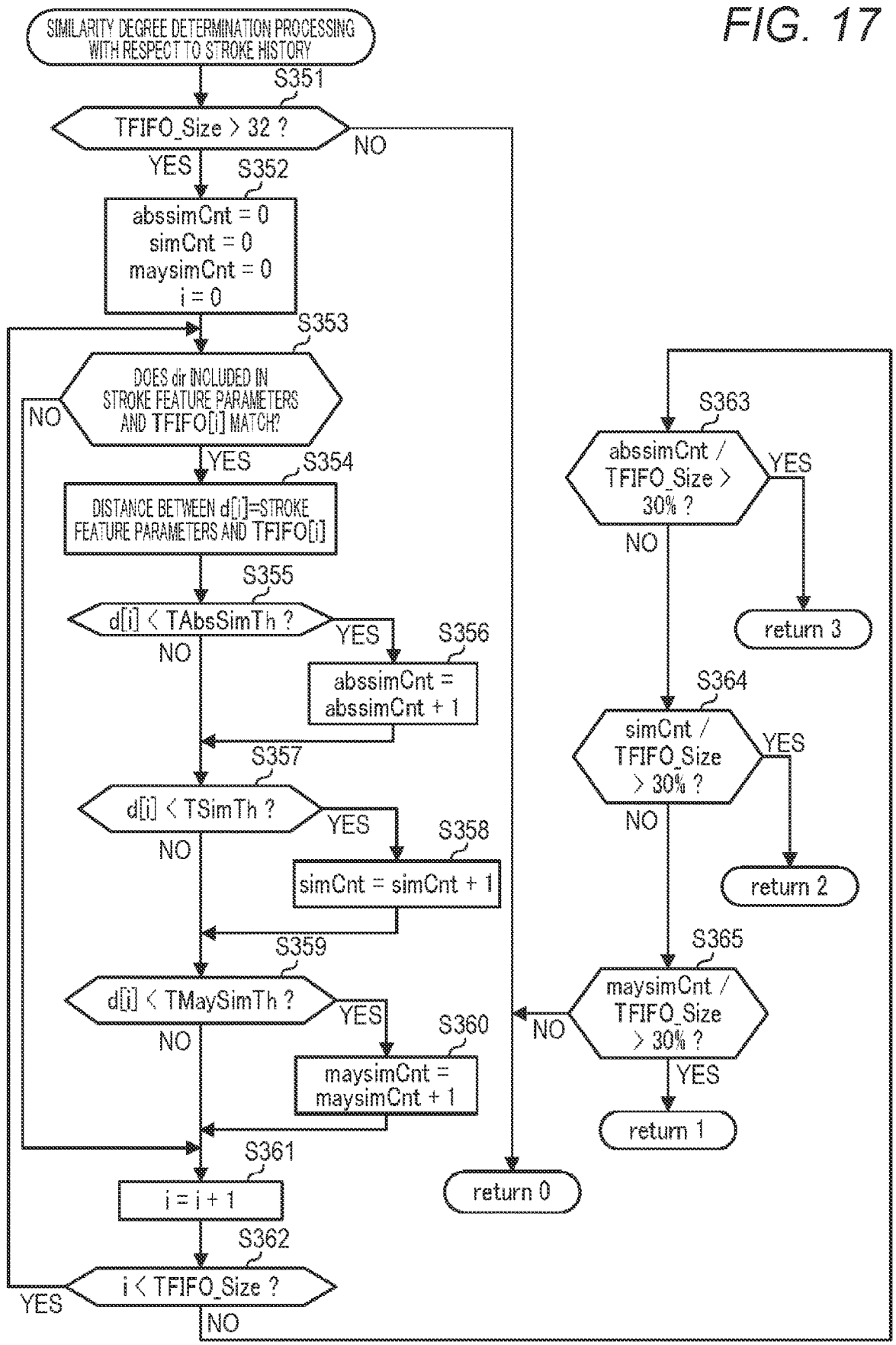
FIG. 17 is a flowchart of a similarity degree determination processing with respect to a stroke history according to the embodiment.

Next, the similarity degree determination processing with respect to the stroke history executed in step S305 of the stroke input processing will be described with reference to FIG. 17.

First, the control unit 110 determines whether a variable TFIFO_Size in which the number of stored stroke histories is stored is larger than the minimum stroke reference number (32 in the present embodiment) (step S351). When TFIFO_Size is equal to or smaller than the minimum stroke reference number (step S351; No), because sufficient similarity degree determination cannot be performed, the control unit 110 ends the similarity degree determination processing with respect to the stroke history with "0" (representing no similarity) as the return value, and proceeds to step S306 of the stroke input processing.

When TFIFO_Size is larger than the minimum stroke reference number (step S351; Yes), the control unit 110 initializes a variable abssimCnt for counting the number of stroke histories having a very high similarity, the variable simCnt for counting the number of stroke histories having a high similarity, a variable maysimCnt for counting the number of stroke histories having a medium similarity, and the variable i for specifying each element (TFIFO [0] to TFIFO [TFIFO_Size−1]) of the stroke histories TFIFO as the array variables to 0 (step S352).

Then, the control unit 110 determines whether the information (dir) on the posture of the robot 200 included in each of the stroke feature parameters calculated in step S304 and TFIFO[i] matches (step S353). When they do not match (step S353; No), the control unit 110 proceeds to step S361.

When the postures (dir) coincide with each other (step S353; Yes), the control unit 110 calculates the distance (L2 norm) between the stroke feature parameters calculated in Step S304 and TFIFO[i], and substitutes the distance into the variable d[i] (step S354). Then, the control unit 110 determines whether the value of the variable d[i] is less than TAbsSimTh (a stroke ultra-high similarity threshold) (step S355). Note that, as TAbsSimTh (the stroke ultra-high similarity threshold), a value smaller than TSimTh (a stroke similarity threshold) to be described later is set in advance. When d[i] is less than TAbsSimTh (step S355; Yes), the control unit 110 adds 1 to the variable abssimCnt (step S356), and proceeds to step S357. When d[i] is equal to or more than TAbsSimTh (step S355; No), the process proceeds to step S357.

Then, in step S357, the control unit 110 determines whether the value of the variable d[i] is less than TSimTh (set in advance as the stroke similar threshold). When d[i] is less than TSimTh (step S357; Yes), the control unit 110 adds 1 to the variable simCnt (step S358), and proceeds to step S359. When d[i] is equal to or more than TSimTh (step S357; No), the process proceeds to step S359.

Then, in step S359, the control unit 110 determines whether the value of the variable d[i] is less than TMaySimTh (a stroke median similarity threshold). Note that a value larger than TSimTh (the stroke similarity threshold) is set in advance as TMaySimTh (the stroke median similarity threshold). When d[i] is less than TMaySimTh (step S359; Yes), the control unit 110 adds 1 to the variable maysimCnt (step S360), and proceeds to step S361. When d[i] is equal to or more than TMaySimTh (step S359; No), the process proceeds to step S361.

In step S361, the control unit 110 adds 1 to the variable i. Then, the control unit 110 determines whether the value of the variable i is less than the variable TFIFO_Size (step S362). When the variable i is less than TFIFO_Size (step S362; Yes), the control unit 110 returns to step S353.

When the variable i is equal to or larger than TFIFO_Size (step S362; No), the control unit 110 determines whether the ratio of the variable abssimCnt to the variable TFIFO_Size exceeds 30% (step S363). When the ratio of the variable abssimCnt to the variable TFIFO_Size exceeds 30% (step S363; Yes), since the similarity degree between the stroke feature parameters calculated in step S304 and the stroke history is very high, the control unit 110 ends the similarity degree determination processing with the stroke history with "3" as the return value, and proceeds to step S306 of the stroke input processing.

On the other hand, when the ratio of the variable abssimCnt to the variable TFIFO_Size is 30% or less (step S363; No), the control unit 110 determines whether the ratio of the variable simCnt to the variable TFIFO_Size exceeds 30% (step S364). When the ratio of the variable simCnt to the variable TFIFO_Size exceeds 30% (step S364; Yes), since the similarity degree between the stroke feature parameters calculated in step S304 and the stroke history is high, the control unit 110 ends the similarity degree determination processing with the stroke history with "2" as the return value, and proceeds to step S306 of the stroke input processing.

On the other hand, when the ratio of the variable simCnt to the variable TFIFO_Size is 30% or less (step S364; No), the control unit 110 determines whether the ratio of the variable maysimCnt to the variable TFIFO_Size exceeds 30% (step S365). When the ratio of the variable maysimCnt to the variable TFIFO_Size exceeds 30% (step S365; Yes), since the similarity degree between the stroke feature parameters calculated in step S304 and the stroke history is median, the control unit 110 ends the similarity degree determination processing with respect to the stroke history with "1" as the return value, and proceeds to step S306 of the stroke input processing.

On the other hand, when the ratio of the variable maysimCnt to the variable TFIFO_Size is 30% or less (step S365; No), since the stroke feature parameters calculated in step S304 are not similar to the stroke history, the control unit 110 ends the similarity degree determination processing with the stroke history with "0" as the return value, and proceeds to step S306 of the stroke input processing. Note that the comparison with "30%" in the above determination is merely an example, and can be changed as necessary together with TAbsSimTh, TSimTh, and TMaySimTh.

Figure 18:
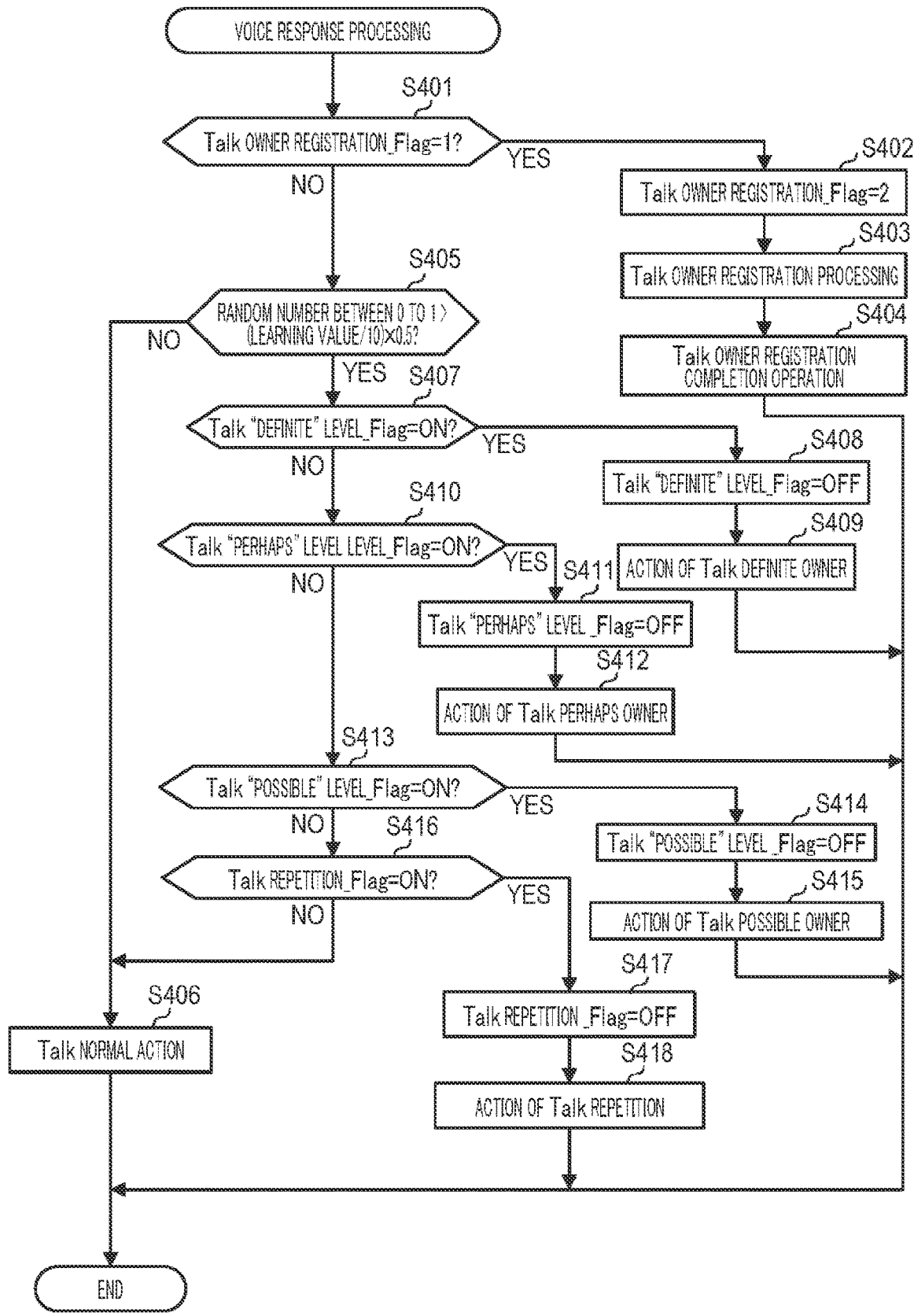
FIG. 18 is a flowchart of voice response processing according to the embodiment.

Next, the voice response processing executed in step S111 of the operation control processing described above will be described with reference to FIG. 18.

To start with, the control unit 110 determines whether the variable Talk owner registration_Flag is 1 (step S401). When the variable Talk owner registration_Flag is 1 (step S401; Yes), the control unit 110 substitutes 2 into the variable Talk owner registration_Flag (step S402). Then, the control unit 110 performs Talk owner registration processing (step S403). The Talk owner registration processing is a process of registering the voice feature parameters calculated in step S208 in the storage unit 120 as the voice feature parameters of the owner's voice.

Then, the control unit 110 performs a Talk owner registration completion operation (step S404). The Talk owner registration completion operation is an operation of the robot 200 for notifying the owner that the voice of the owner has been stored, and for example, is an operation of performing a pleasing gesture of ringing five times. Then, the voice response processing is ended, and the processing proceeds to step S112 of the operation control processing.

On the other hand, when the variable Talk owner registration_Flag is not 1 (step S401; No), the control unit 110 generates a random number of 0 or more and less than 1, and determines whether the generated random number is larger than (learning value±10)×0.5 (step S405). When the generated random number is (learning value±10)×0.5 or less (step S405; No), the control unit 110 performs a Talk normal action (step S406). The Talk normal action is a normal action performed when the robot 200 is talked to by the user, and specifically, is an operation (in FIG. 10, a basic motion 1-0, a basic motion 1-1, or a character motion 1-0 is illustrated) set as the motion type in a case where the robot is talked to as the motion trigger in the learning table 123. Then, the control unit 110 ends the voice response processing and proceeds to step S112 of the operation control processing.

On the other hand, when the generated random number is larger than (learning value±10)×0.5 (step S405; Yes), the control unit 110 determines whether the variable Talk "definite" level_Flag is ON (step S407). When the variable Talk absolute_Flag is ON (step S407; Yes), the control unit 110 substitutes OFF for the variable Talk "definite" level_Flag (step S408) and performs an action of the Talk definite owner (step S409). The action of the Talk definite owner is a friendly action performed when the robot 200 recognizes a person who has called as "definitely the owner", and is, for example, a motion of wishing to go toward the owner with joy. Then, the control unit 110 ends the voice response processing and proceeds to step S112 of the operation control processing.

On the other hand, when the variable Talk "definite" level_Flag is not ON (step S407; No), the control unit 110 determines whether the variable Talk "perhaps" level_Flag is ON (step S410). When the variable Talk "perhaps" level_Flag is ON (step S410; Yes), the control unit 110 substitutes OFF for the variable Talk "perhaps" level_Flag (step S411) and performs the action of the Talk perhaps owner (step S412). The action of the Talk perhaps owner is a friendly action performed when the robot 200 recognizes a person who has called as "perhaps the owner", and is, for example, an action of making a pleasing gesture. Then, the control unit 110 ends the voice response processing and proceeds to step S112 of the operation control processing.

On the other hand, when the variable Talk "perhaps" level_Flag is not ON (step S410; No), the control unit 110 determines whether the variable Talk "possible" level_Flag is ON (step S413). When the variable Talk "possible" level_Flag is ON (step S413; Yes), the control unit 110 substitutes OFF for the variable Talk "possible" level_Flag (step S414), and performs the action of the Talk possible owner (step S415). The action of the Talk possible owner is a friendly action performed when the robot 200 recognizes that a person who has called "possibly the owner", for example, an action of making a gesture such as "What?". Then, the control unit 110 ends the voice response processing and proceeds to step S112 of the operation control processing.

On the other hand, when Talk "possible" level_Flag is not ON (step S413; No), the control unit 110 determines whether the variable Talk repetition_Flag is ON (step S416). When the variable Talk repetition_Flag is ON (step S416; Yes), the control unit 110 substitutes OFF for the variable Talk repetition_Flag (step S417) and performs the action of the Talk repetition (step S418). The action of the Talk repetition is an operation performed when the robot 200 recognizes that "someone is calling", and is, for example, an operation of trying to go toward the calling person by making a gesture of "What?". Then, the control unit 110 ends the voice response processing and proceeds to step S112 of the operation control processing.

On the other hand, when the variable Talk repetition_Flag is not ON (step S416; No), the control unit 110 performs the Talk normal action (step S406), ends the voice response processing, and proceeds to step S112 of the operation control processing.

Figure 19:
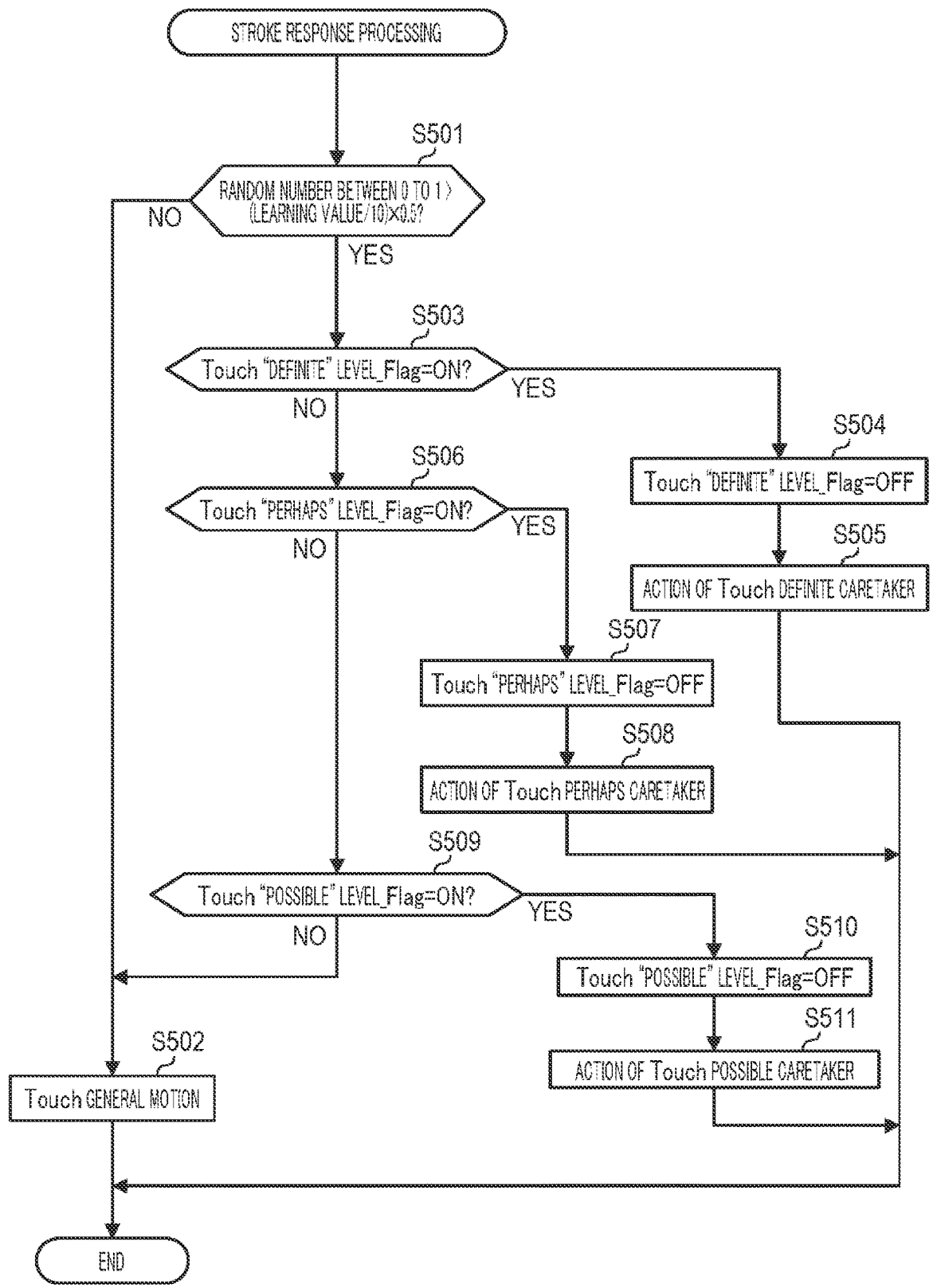
FIG. 19 is a flowchart of stroke response processing according to the embodiment.

Next, the stroke response processing executed in step S108 of the operation control processing described above will be described with reference to FIG. 19.

To start with, the control unit 110 generates a random number of 0 or more and less than 1, and determines whether the generated random number is larger than (learning value±10)×0.5 (step S501). When the generated random number is (learning value±10)×0.5 or less (step S501; No), the control unit 110 performs the Touch normal action (step S502). The Touch normal action is a normal action performed when the robot 200 is stroked or held by the user, and specifically, is an operation set as an operation type in a case where the robot is stroked or held as described in the motion trigger on the learning table 123. Then, the control unit 110 ends the stroke response processing and proceeds to step S109 of the operation control processing.

On the other hand, when the generated random number is larger than (learning value±10)×0.5 (step S501; Yes), the control unit 110 determines whether the variable Touch "definite" level_Flag is ON (step S503). When the variable Touch "definite" level_Flag is ON (step S503; Yes), the control unit 110 substitutes OFF for the variable Touch "definite" level_Flag (step S504), and performs the action of a Touch definite caretaker (step S505). The action of the Touch definite caretaker is a friendly action performed when the robot 200 recognizes that the person who has stroked is "the person who always takes care of the robot", and is, for example, an operation of making a gesture of showing joy. Then, the control unit 110 ends the stroke response processing and proceeds to step S109 of the operation control processing.

On the other hand, when the variable Touch "definite" level_Flag is not ON (step S503; No), the control unit 110 determines whether the variable Touch "perhaps" level_Flag is ON (step S506). When the variable Touch "perhaps" level_Flag is ON (step S506; Yes), the control unit 110 substitutes OFF for the variable Touch "perhaps" level_Flag (step S507), and performs the action of the Touch "perhaps" level_Flag (step S508). The action of the Touch perhaps caretaker action is a friendly action performed when the robot 200 recognizes that a person who strokes is "probably a person who always takes care of the robot", and is, for example, an action of making a pleasing gesture. Then, the control unit 110 ends the stroke response processing and proceeds to step S109 of the operation control processing.

On the other hand, when the variable Touch "perhaps" level_Flag is not ON (step S506; No), the control unit 110 determines whether the variable Touch "possible" level_Flag is ON (step S509). When the Touch "possible" level_Flag is ON (step S509; Yes), the control unit 110 substitutes OFF for the variable Touch "possible" level_Flag (step S510), and performs the action of the Touch perhaps caretaker (step S511). The action of the Touch perhaps caretaker is a friendly action performed when the robot 200 recognizes a person who strokes is "perhaps a person who always takes care of the robot", and is, for example, an action of making a gesture such as "What?". Then, the control unit 110 ends the stroke response processing and proceeds to step S109 of the operation control processing.

On the other hand, when the Touch "possible" level_Flag is not ON (step S509; No), the control unit 110 performs the Touch normal action (step S502), terminates the stroke response processing, and proceeds to step S109 of the operation control processing.

In addition, in the operation control processing described above, the target of the outside stimulus of the owner registration function or the calling response function is only voice, but this is merely an example. When the robot 200 is repeatedly stroked for a certain registration time (for example, three minutes) from the first power-on of the robot, the control unit 110 may store the stroke feature parameters in the storage unit 120 as the owner's feature (registered stroking method information).

In addition, when the robot 200 is repeatedly touched in a similar pattern (stroked or held) (after owner registration or after a lapse of a certain registration time (for example, 3 minutes) or more from the first power-on), regardless of whether a person who touches the robot is the owner, the robot may recognize that it is touched by someone and perform an operation (for example, the action of uttering a spoiling cry) as a reaction to the touching.

Through the operation control processing described above, the control unit 110 acquires the outside stimulus feature amounts (the voice feature parameters and the stroke feature parameters), stores the acquired outside stimulus feature amounts in the storage unit 120 as the outside stimulus history (the voice history and the stroke history), calculates the distance (the first similarity degree) between the outside stimulus feature amounts acquired at a certain timing and the outside stimulus feature amounts stored in the storage unit 120, and controls the operations of the robot 200 based on the calculated first similarity degree. For this reason, even when the owner or the like is not registered, when the feature amounts of the way of calling or stroking method are similar to the outside stimulus feature amounts stored in the storage unit 120 as a history, the robot 200 can recognize that the person is likely to be the owner and perform the friendly action, and the user can feel attached.

In addition, even when the user does not perform a special operation, the control unit 110 can acquire, by the sensor unit 210, a repeated calling and a stroking manner performed within a certain registration time after the initial power-on as a voice or a stroking manner (the specific stimulus) of the owner (the specific user), acquire a specific stimulus feature amount (registered voice or registered stroking method information) from the acquired specific stimulus (the voice or stroking method), and store the specific stimulus feature amount in the storage unit 120. Then, a distance (the second similarity degree) between the outside stimulus feature amounts acquired at a certain timing and the specific stimulus feature amounts stored in the storage unit 120 is calculated, and the operation of the robot 200 is controlled also based on the calculated second similarity degree. Therefore, even when the user does not consciously register the owner or the like, when the feature amounts of the way of calling or stroking method are similar to the specific stimulus feature amounts stored in the storage unit 120, the robot 200 can recognize that the person is the owner and perform the friendly action, and the user can feel attached.

In addition, regardless of whether the voice or the stroking method of the specific user such as the user is stored in the storage unit 120 as the specific stimulus feature amounts, the control unit 110 acquires the continuous determination feature amounts, which are the outside stimulus feature amounts of the consecutive determination storages, from the outside stimulus history, calculates the distance (a third similarity degree) between the outside stimulus feature amounts acquired at a certain timing and the continuous determination feature amounts, and controls the operations of the robot 200 based on the calculated third similarity degree. Therefore, even when the owner or the like is not registered, the robot 200 can perform an operation of reacting to the calling via being repeatedly called by the owner or the like for many times, and the user can feel attached to the robot.

In addition, since the control unit 110 performs the FFT twice on the voice data acquired as the outside stimulus and calculates the reference number (3) of cepstrums as the voice feature parameters, it is possible to acquire the voice feature parameters with which the owner can be recognized with considerably high accuracy despite a small calculation amount.

In addition, since the control unit 110 acquires the acceleration and a plurality of contact pressures as the outside stimuli, it is possible to acquire the stroke feature parameters in which the direction (posture) when the robot 200 is held and the stroked manner are integrated.

Furthermore, the control unit 110 can improve determination accuracy of the orientation (posture) of the robot 200 by using the machine learned identifier.

Modified Examples

Note that the present disclosure is not limited to the embodiments described above, and various modifications and applications are possible. For example, the friendly action may change according to the learning value or the personality, similarly to the normal action.

Furthermore, the operation of the robot 200 is not limited to the operation by the drive unit 220 or the output of voice data. In a case where the output unit 230 of the robot 200 is provided with an LED, the control unit 110 may control the color and brightness of the LED to be turned on as an operation of the robot 200. The controlled units controlled by the control unit 110 may include at least one of the drive unit 220 and the output unit 230, and the output unit 230 may output only sound as a sound output unit or may output only light by an LED or the like.

In addition, the method of setting the configuration of the emotion map 300, the emotion data 121, the emotion change data 122, the personality data, the learning value, and the like, in the embodiment described above is merely an example. For example, a numerical value obtained by dividing the learning days data 125 by a certain number (always set to 10 when exceeding 10) may be set as the learning value as a simpler way.

Furthermore, in the above embodiment, the control unit 110 that controls the robot 200 is built in the robot 200, but the control unit 110 that controls the robot 200 is not necessarily built in the robot 200. For example, a control device (not illustrated) including a control unit, a storage unit, and a communication unit may be configured as a device (for example, a server) separate from the robot 200. In this modification, the communication unit 130 of the robot 200 and the communication unit of the control device are configured to be able to transmit and receive data to and from each other. Then, the control unit of the control device acquires the outside stimuli detected by the sensor unit 210 and controls the drive unit 220 and the output unit 230 via the communication unit of the control device and the communication unit 130 of the robot 200.

Note that, in a case where the control device and the robot 200 are configured as separate devices in this manner, the robot 200 may be controlled by the control unit 110 as needed. For example, a simple operation is controlled by the control unit 110, and a complicated operation is controlled by the control unit of the control device via the communication unit 130.

In the embodiment described above, the operation program executed by the CPU of the control unit 110 is stored in advance in the ROM or the like of the storage unit 120. However, the present disclosure is not limited thereto, and an operation program for executing various processing described above may be implemented in an existing general-purpose computer or the like, to function as a device corresponding to the control unit 110 and the storage unit 120 of the robot 200 according to the embodiment described above.

A method of providing such a program is arbitrary, and for example, the program may be stored and distributed in a computer-readable recording medium (a flexible disk, a compact disc (CD)-ROM, a digital versatile disc (DVD)-ROM, a magneto-optical disc (MO), a memory card, a USB memory, and the like), or may be provided by storing the program in a storage on a network such as the Internet and downloading the program.

In addition, in a case where the processing described above is executed by sharing between an operating system (OS) and an application program or by cooperation between the OS and the application program, only the application program may be stored in a recording medium or a storage. In addition, it is also possible to superimpose a program on a carrier wave and distribute the program via a network. For example, the program may be posted on a bulletin board system (BBS) on a network, and the program may be distributed via the network. Furthermore, the processing may be executed by starting the program and executing the program in the same manner as other application programs under the control of the OS.

Furthermore, the control unit 110 may be configured by not only a single arbitrary processor such as a single processor, a multiprocessor, or a multi-core processor, but also a combination of the arbitrary processor and a processing circuit such as an application specific integrated circuit (ASIC) or a field-programmable gate array (FPGA).

The present disclosure enables various embodiments and modifications without departing from the broad spirit and scope of the present disclosure. In addition, the embodiments described above are for describing the present disclosure, and do not limit the scope of the present disclosure. In other words, the scope of the present disclosure is indicated not by the embodiments but by the claims. In addition, various modifications made within the scope of the claims and the meaning of the disclosures equivalent thereto are regarded as being within the scope of the present disclosure.

What is claimed is:

1. A robot comprising:
a storage; and
at least one processor,
wherein the at least one processor is configured to:
acquire outside stimulus feature amounts each of which indicates a feature amount of an outside stimulus acting from outside the robot,
store the acquired outside stimulus feature amounts in the storage as a history up to a maximum history storage number by a first-in-first-out method,
acquire a plurality of continuous determination feature amounts, the continuous determination feature amounts being a number of consecutive outside stimulus feature amounts from among latest ones of the outside stimulus feature amounts stored in the storage, and a number of the acquired continuous determination feature amounts being smaller than the maximum history storage number,
calculate a first similarity degree by comparing an outside stimulus feature amount acquired during processing of an outside stimulus acting from outside the robot with the acquired continuous determination feature amounts, and
control operations of the robot based on the calculated first similarity degree.

2. The robot according to claim 1, wherein the at least one processor is configured to:
acquire a specific stimulus feature amount that is a feature amount of a specific stimulus that is an outside stimulus from a specific user,
store the acquired specific stimulus feature amount in the storage,
calculate a second similarity degree by comparing an outside stimulus feature amount acquired during processing of an outside stimulus acting from outside the robot with the acquired specific stimulus feature amount stored in the storage, and
control the operations of the robot based on the calculated first similarity degree and the calculated second similarity degree.

3. The robot according to claim 1, wherein the at least one processor is configured to acquire voice data as the outside stimulus.

4. The robot according to claim 3, wherein the at least one processor is configured to:
acquire a frequency spectrum by Fourier transforming the voice data, and
acquire a part of a cepstrum obtained by Fourier transforming the acquired frequency spectrum as the outside stimulus feature amounts.

5. The robot according to claim 1, wherein the at least one processor is configured to acquire an acceleration and a plurality of contact pressures as the outside stimulus feature amounts.

6. The robot according to claim 5, wherein the at least one processor is configured to:
determine an orientation of the robot based on the acceleration, and
acquire the outside stimulus feature amounts from the determined orientation and the plurality of contact pressures.

7. The robot according to claim 6, wherein the at least one processor is configured to:
determine the orientation of the robot based on an orientation of the robot obtained by a machine-learned identifier from a history of the acceleration and an acceleration acquired during processing of an outside stimulus acting from outside the robot.

8. The robot according to claim 1, wherein the at least one processor is configured to:
calculate a third similarity degree by comparing an outside stimulus feature amount acquired during processing of an outside stimulus acting from outside the robot with the outside stimulus feature amounts stored in the storage, and
control the operations of the robot based on the calculated first similarity degree and the calculated third similarity degree.

9. A robot control method executed by a robot to control operation of the robot, the method comprising:
acquiring outside stimulus feature amounts each of which indicates a feature amount of an outside stimulus acting from outside the robot,
storing the acquired outside stimulus feature amounts in a storage as a history up to a maximum history storage number by a first-in-first-out method,
acquiring a plurality of continuous determination feature amounts, the continuous determination feature amounts being a number of consecutive outside stimulus feature amounts from among latest ones of the outside stimulus feature amounts stored in the storage, and a number of the acquired continuous determination feature amounts being smaller than the maximum history storage number,
calculating a first similarity degree by comparing an outside stimulus feature amount acquired during processing of an outside stimulus acting from outside the robot with the acquired continuous determination feature amounts, and
controlling operations of the robot based on the calculated first similarity degree.

10. A non-transitory computer-readable recording medium storing a program for causing a computer included in a robot to execute processes comprising:
acquiring outside stimulus feature amounts each of which indicates a feature amount of an outside stimulus acting from outside the robot;
storing the acquired outside stimulus feature amounts in a storage as a history up to a maximum history storage number by a first-in-first-out method;
acquiring a plurality of continuous determination feature amounts, the continuous determination feature amounts being a number of consecutive outside stimulus feature amounts from among latest ones of the outside stimulus feature amounts stored in the storage, and a number of the acquired continuous determination feature amounts being smaller than the maximum history storage number;
calculating a first similarity degree by comparing an outside stimulus feature amount acquired during processing of an outside stimulus acting from outside the robot with the acquired continuous determination feature amounts; and
controlling operations of the robot based on the calculated first similarity degree.

\* \* \* \* \*